(12) United States Patent  
Kim et al.

(10) Patent No.: US 11,316,380 B2  
(45) Date of Patent: Apr. 26, 2022

(54) WIRELESS POWER TRANSFER APPARATUS HAVING VARIOUS TYPES OF COILS, AND SYSTEM INCLUDING THE SAME

(71) Applicant: LG ELECTRONICS INC., Seoul (KR)

(72) Inventors: Sungkyu Kim, Seoul (KR); Bongsik Kwak, Seoul (KR); Hyunggeol Kwak, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/028,733

(22) Filed: Sep. 22, 2020

(65) Prior Publication Data

US 2021/0091601 A1   Mar. 25, 2021

(30) Foreign Application Priority Data

Sep. 23, 2019 (KR) .......................... 10-2019-0116496

(51) Int. Cl.
*H02J 50/00* (2016.01)
*H02J 50/40* (2016.01)
(Continued)

(52) U.S. Cl.
CPC ............ *H02J 50/402* (2020.01); *H02J 50/12* (2016.02); *H04B 5/0037* (2013.01)

(58) Field of Classification Search
CPC .......... H02J 50/00; H02J 50/402; H04B 5/00; H04B 5/0037
See application file for complete search history.

(56) References Cited

U.S. PATENT DOCUMENTS 9,397,505 B2 * 7/2016 Lee ........................ H02J 50/80
9,413,175 B2 * 8/2016 Park ....................... H02J 50/70
(Continued)

FOREIGN PATENT DOCUMENTS

CN        107438934 A    12/2017
EP          3525219 A1     8/2019
(Continued)

*Primary Examiner* — Adi Amrany
(74) *Attorney, Agent, or Firm* — Birch, Stewart, Kolasch & Birch, LLP

(57) ABSTRACT

A wireless power transmitter can include a power transmitter including a plurality of first transmitting coils and a second transmitting coil; and a controller, in which the plurality of first transmitting coils are disposed on a same plane, the second transmitting coil is disposed on a different plane than the plurality of first transmitting coils, the second transmitting coil is disposed at a center of a region corresponding to the plurality of first transmitting coils, an area of a region corresponding to the second transmitting coil is smaller than an area of the region corresponding to the plurality of first transmitting coils, and the controller is configured to transmit power to a wireless power receiver through the plurality of first transmitting coils and the second transmitting coil when a receiving coil in the wireless power receiver is of a first type, and transmit power to the wireless power receiver through the second transmitting coil when the type of the receiving coil is of a second type.

19 Claims, 22 Drawing Sheets

(51) Int. Cl.
*H02J 50/12* (2016.01)
*H04B 5/00* (2006.01)

(56) References Cited

U.S. PATENT DOCUMENTS

| | | | |
|---|---|---|---|
| 9,906,274 B2* | 2/2018 | Jung | H02J 50/402 |
| 2008/0122570 A1* | 5/2008 | Takaishi | H01F 27/36 |
| | | | 336/84 M |
| 2009/0096413 A1* | 4/2009 | Partovi | H01F 27/36 |
| | | | 320/108 |
| 2012/0098486 A1* | 4/2012 | Jung | H02J 5/005 |
| | | | 320/108 |
| 2013/0069586 A1* | 3/2013 | Jung | H02J 50/12 |
| | | | 320/108 |
| 2014/0035422 A1 | 2/2014 | Mikami et al. | |
| 2014/0285008 A1* | 9/2014 | Azancot | F21V 23/02 |
| | | | 307/24 |
| 2017/0178804 A1* | 6/2017 | Leem | H02J 50/70 |
| 2019/0026411 A1 | 1/2019 | Mehas et al. | |
| 2020/0044482 A1* | 2/2020 | Partovi | G06F 1/1683 |
| 2020/0227954 A1* | 7/2020 | Ding | H02J 50/10 |

FOREIGN PATENT DOCUMENTS

| | | |
|---|---|---|
| KR | 10-1213090 B1 | 12/2012 |
| KR | 10-2014-0146530 A | 12/2014 |
| KR | 10-2015-0057963 A | 5/2015 |
| KR | 10-1622694 B1 | 5/2016 |

* cited by examiner

180

WIRELESS POWER TRANSFER APPARATUS HAVING VARIOUS TYPES OF COILS, AND SYSTEM INCLUDING THE SAME

CROSS REFERENCE TO RELATED APPLICATIONS

This application claims the priority benefit of Korean Patent Application No. 10-2019-0116496, filed in the Republic of Korea on Sep. 23, 2019, which is incorporated herein by reference for all purposes as if fully set forth herein.

BACKGROUND OF THE INVENTION

1. Field of the Invention

The present disclosure relates to a wireless power transmitter (or wireless power transfer apparatus) and a system including the same, and more particularly to a wireless power transmitter capable of transmitting both low power and medium power, and a system including the same.

2. Description of the Related Art

A terminal supply method is generally used to transfer power to electronic devices, in which commercial power is supplied to the electronic devices connected via physical cables or wires. However, the terminal supply method has problems in that the cables or wires occupy a considerable amount of space and may not be organized easily, and there is a danger of wire breakage.

Recently, in order to solve the above problems, there has been research to provide wireless power transfer methods. A wireless power transfer system is composed of a wireless power transmitter for transmitting power through a single coil or multiple coils, and a wireless power receiver for receiving power transmitted wirelessly from the wireless power transmitter and using the received power.

As a wireless power transfer method, an inductive coupling method is generally used, in which a magnetic field is changed by changing a current strength of a current flowing through a primary coil of two adjacent coils, thereby causing a change in magnetic flux passing through a secondary coil, and generating an induced electromotive force on the secondary coil side. That is, in the method, the induced electromotive force may be generated by only changing the current of the primary coil while the two coils are separated from each other, without spatially moving two conductive wires.

The Wireless Power Consortium (WPC), which manages technologies for magnetic inductive wireless power transfer, has published a standard document "System Description Wireless Power Transfer, Volume 1, Low Power, Part 1: Interface Definition, Version 1.00 Release Candidate 1 (RC1)" for interoperability in the wireless power transfer. The standard document of the WPC relates to a low power charging technology for low power of about 5 W, which is primarily applied to mobile terminals.

Furthermore, as devices having a wireless charging function are provided in a larger size and in various types, there is a need to develop a medium power charging technology for medium power greater than low power, and active research is underway on the technology.

SUMMARY OF THE INVENTION

It is an object of the present disclosure to provide a wireless power transmitter and a system including the same, in which the wireless power transmitter, including both a plurality of first transmitting coils for medium power transmission and a second transmitting coil for low power transmission, can transfer both low power and medium power.

It is another object of the present disclosure to provide a wireless power transmitter and a system including the same, in which the plurality of first transmitting coils, included in the wireless power transmitter, can be disposed to not overlap each other on the same plane.

It is yet another object of the present disclosure to provide a wireless power transmitter and a system including the same, in which the wireless power transmitter can accurately determine a position of the wireless power receiver in a charging area corresponding to the plurality of first transmitting coils.

It is still another object of the present disclosure to provide a wireless power transmitter and a system including the same, in which even when it is difficult to transmit power, satisfying predetermined criteria, through the second transmitting coil, the first transmitting coils can be used to transmit power, satisfying the predetermined criteria, to the wireless power receiver based on alignment of the second transmitting coil and the wireless power receiver.

In order to achieve the above objects, the wireless power transmitter according to an embodiment of the present disclosure can include different types of transmitting coils, and can transmit power by selecting a transmitting coil corresponding to a type of a receiving coil included in the wireless power receiver.

In accordance with an aspect of the present disclosure, the above and other objects can be accomplished by providing a wireless power transmitter, including: a power transmitter including a plurality of first transmitting coils and a second transmitting coil; and a controller, in which the plurality of first transmitting coils are disposed on a same plane; the second transmitting coil is disposed on a plane different from the plane on which the plurality of first transmitting coils are disposed; the second transmitting coil is disposed at a center of a region corresponding to the plurality of first transmitting coils; an area of a region corresponding to the second transmitting coil is smaller than an area of the region corresponding to the plurality of first transmitting coils; and the controller, which in response to a type of a receiving coil, included in a wireless power receiver, being a first type, transmits power to the wireless power receiver through the plurality of first transmitting coils and the second transmitting coil, and in response to a type of the receiving coil being a second type, transmits power to the wireless power receiver through the second transmitting coil.

In accordance with another aspect of the present disclosure, the above and other objects can be accomplished by providing a wireless power system including a wireless power transmitter and a wireless power receiver, the wireless power transmitter including: a power transmitter including a plurality of first transmitting coils and a second transmitting coil; and a controller, in which the plurality of first transmitting coils are disposed on a same plane; the second transmitting coil is disposed on a plane different from the plane on which the plurality of first transmitting coils are disposed; the second transmitting coil is disposed at a center of a region corresponding to the plurality of first transmitting coils; an area of a region corresponding to the second transmitting coil is smaller than an area of the region corresponding to the plurality of first transmitting coils; and the controller, which in response to a type of a receiving coil, included in a wireless power receiver, being a first type, transmits power to the wireless power receiver through the plurality of first transmitting coils and the second transmitting coil, and in response to a type of the receiving coil being a second type, transmits power to the wireless power receiver through the second transmitting coil.

DETAILED DESCRIPTION OF THE EMBODIMENTS

Figure 1:
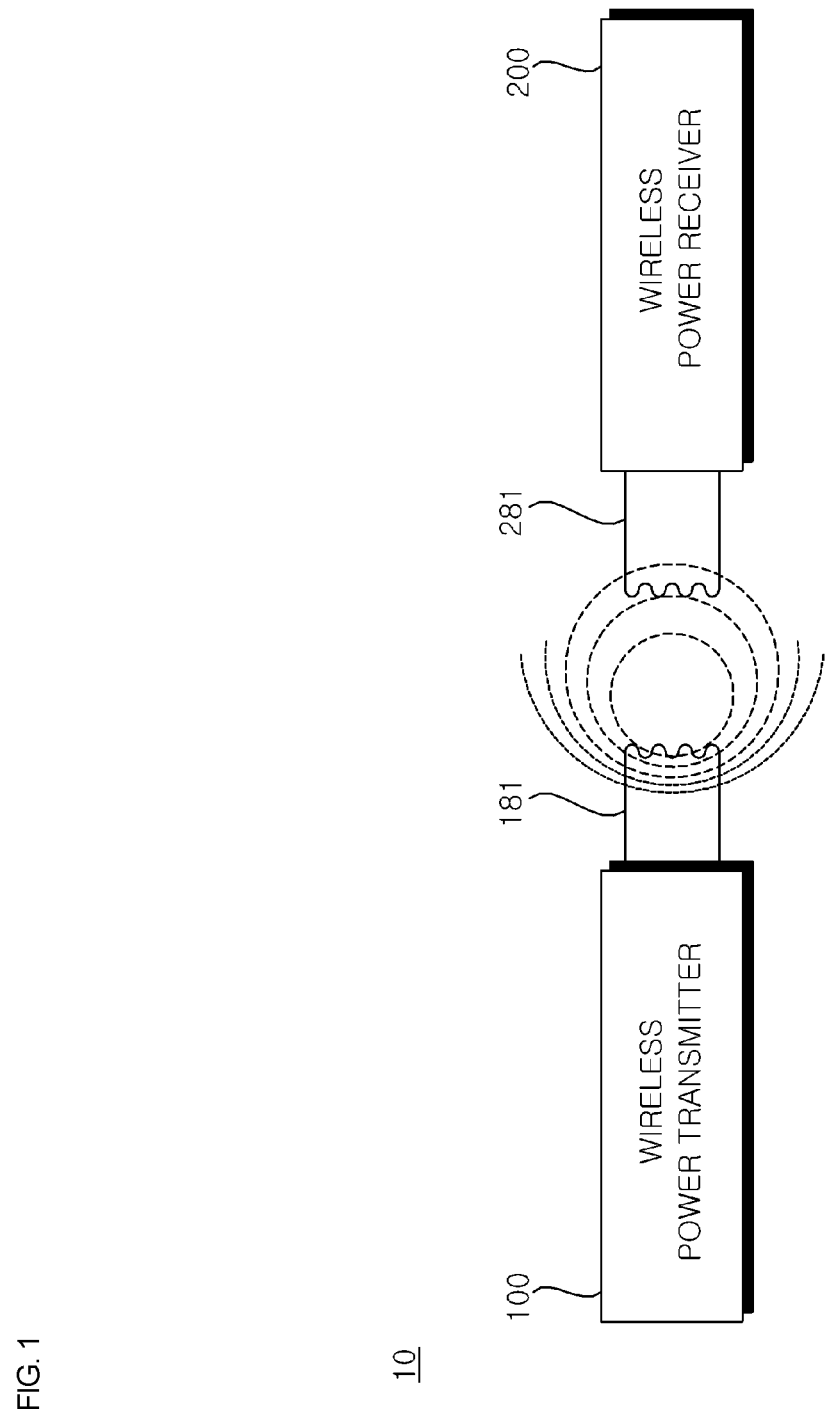
FIG. 1 is a block diagram illustrating a wireless power system according to an embodiment of the present disclosure.

Reference will now be made in detail to the embodiments of the present disclosure, examples of which are illustrated in the accompanying drawings. To clearly and briefly describe the present disclosure, a part without concerning to the description is omitted in the drawings, and the same or like reference numerals in the specification denote the same elements.

The suffixes "module" and "unit" of elements herein are used for convenience of description and thus can be used interchangeably and do not have any distinguishable meanings or functions. Thus, the "module" and the "unit" may be interchangeably used.

Throughout this specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

It will be understood that, although the terms "first," "second," "third" etc. may be used herein to describe various elements, these elements should not be limited by these terms. These terms are only used to distinguish one element from another element.

FIG. 1 is a block diagram illustrating a wireless power system according to an embodiment of the present disclosure. Referring to FIG. 1, the wireless power system 10 may include a wireless power transmitter 100 configured to transmit power wirelessly and a wireless power receiver 200 configured to receive the transmitted power.

The wireless power transmitter 100 may transmit power wirelessly to the wireless power receiver 200 by using a magnetic induction method, in which a magnetic field is changed by a current flowing through coils 181, such that the current is induced to flow in a coil 281 of the wireless power receiver 200.

In this situation, the wireless power transmitter 100 and the wireless power receiver 200 may use a wireless charging method based on electromagnetic induction defined by the Wireless Power Consortium (WPC) or Power Matters Alliance (PMA). Alternatively, the wireless power transmitter 100 and the wireless power receiver 200 may use a wireless charging method based on magnetic resonance defined by the Alliance for Wireless Power (A4WP).

In order to distinguish between the coil 181, included in the wireless power transmitter 100, and the coil 281 included in the wireless power receiver 200, the coil 181 in the wireless power transmitter 100 may be referred to as a transmitting coil, and the coil 281 in the wireless power receiver 200 may be referred to as a receiving coil.

The wireless power transmitter 100 may include different types of transmitting coils 181. For example, the wireless power transmitter 100 may include a first transmitting coil for medium-power transmission, and a second transmitting coil for low-power transmission. Here, the low power may refer to power of about 5 W, and the medium power may refer to power of several W or more.

In one embodiment, the single wireless power transmitter 100 may transmit power to a plurality of wireless power receivers 200. In this situation, the wireless power transmitter 100 may transmit power to the plurality of wireless power receivers 200 in a time-division manner. However, the present disclosure is not limited thereto, and the wireless power transmitter 100 may transmit power to the plurality of wireless power receivers 200 by using different frequency bands assigned to each of the plurality of wireless power receivers 200.

A number of wireless power receivers 200, which may receive power from the single wireless power transmitter 100, may be determined adaptively by considering a required amount of power of each of the plurality of wireless power receivers 300, an amount of available power of the wireless power transmitter 100, and the like.

In another embodiment, a plurality of wireless power transmitters 100 may transmit power to at least one wireless power receiver 200. In this situation, the at least one wireless power receiver 200 may be connected concurrently to the plurality of wireless power transmitters 100, and may receive power concurrently from the connected wireless power transmitters 100.

Further, a number of wireless power transmitters 100 may be determined adaptively by considering a required amount of power of each of at least one wireless power receiver 200, an amount of available power of the wireless power transmitter 100, and the like.

The wireless power receiver 20 may receive power transmitted from the wireless power transmitter 100. For example, the wireless power receiver 200 may be a wearable device, such as a mobile phone, a laptop computer, and a smart watch, and an electronic device such as a Personal Digital Assistant (PDA), a Portable Multimedia Player (PMP), a navigation device, an MP3 player, an electric toothbrush, an illumination system, and a remote control. However, the wireless power receiver 200 is not limited thereto, and may be a home appliance, such as a citrus press, a hand blender, a blender, a juicer, a smart pan, a kettle, and a rice cooker.

The wireless power transmitter 100 and the wireless power receiver 200 may communicate with each other. Depending on embodiments, the wireless power transmitter 100 and the wireless power receiver 200 may communicate with each other through one-way communication or half-duplex communication.

In this situation, a communication method may include an in-band communication method using the same frequency band as an operating frequency used for wireless power transmission, and/or an out-of-band communication method using a different frequency band from an operating frequency used for wireless power transmission.

Data, transmitted and received between the wireless power transmitter 100 and the wireless power receiver 200, may include data about device status, data about power consumption, data about battery charging, an output voltage and/or an output current of a battery, data about control instructions, and the like.

Figure 2:
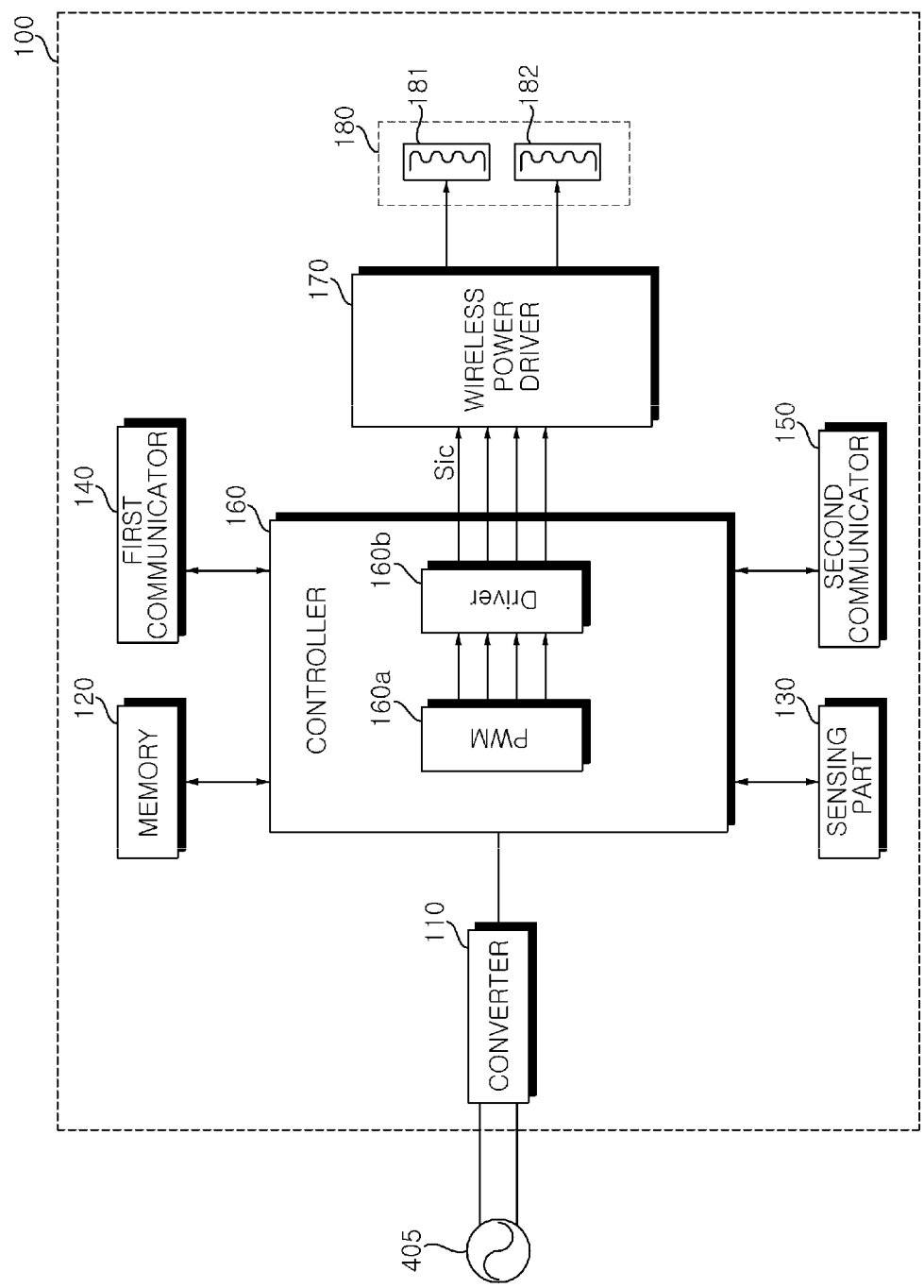
FIG. 2 is an internal block diagram illustrating a wireless power transmitter according to an embodiment of the present disclosure.

FIG. 2 is an internal block diagram illustrating a wireless power transmitter according to an embodiment of the present disclosure. Referring to FIG. 2, the wireless power transmitter 100 includes a controller 160 for controlling various components of the wireless power transmitter 100, a wireless power driver 170 for converting a direct current (DC) voltage into an alternating current (AC) voltage, and a power transmitter 180 for wirelessly transmitting power by using the AC voltage.

In addition, the wireless power transmitter 100 includes a converter 110 for converting a commercial AC voltage 405 into a DC voltage, a memory 120 for storing a control program for driving the wireless power transmitter 100 and the like, a sensing part 130 for sensing a current and/or a voltage input to components of the power transmitter 180, and/or a first communicator 140 and a second communicator 150 for communication with the wireless power receiver 200.

The converter 110 may rectify the input AC voltage into the DC voltage and may output the DC voltage. In this situation, the AC voltage may be a single-phase or three-phase AC voltage. For example, each of the components of the wireless power transmitter 100 may operate on DC power output from the converter 110.

In FIG. 2, the commercial AC voltage 405 is a single-phase AC voltage, but the present disclosure is not limited thereto, and may also be a three-phase AC voltage. Depending on the type of the commercial AC voltage 405, an internal structure of the converter 110 may be changed.

The converter 110 may include a bridge diode. For example, the converter 110 may include upper arm diode elements and lower arm diode elements, each pair of an upper arm diode element and a lower arm diode element being connected in series, and a total of two or three pairs of upper and lower arm diode elements being connected in parallel. In addition, the converter 110 may further include a plurality of switching elements.

The memory 120 may store various data for the overall operation of the wireless power transmitter 100, including programs for processing or controlling the controller 160 and the like. Furthermore, various data stored in the memory 120 may include data values calibrated by factory calibration.

The sensing part 130 may sense the current and voltage input to the power transmitter 180, temperature of each coil, and the like. The sensor part 130 may include at least one sensor. For example, the sensing part 130 may include a magnetic sensor for sensing a surrounding magnetic field. The magnetic sensor may be a Hall sensor operating based on the Hall effect. The sensing part 130 may include a plurality of magnetic sensors.

In the present disclosure, description is given of an example in which the magnetic sensor is the Hall sensor, but the present disclosure is not limited thereto, and the magnetic sensor may be a magnetoresistor, a circuit element such as a magnetic transistor including a magnetic sensor having an amplification function and the like, and may be a multi-axis magnetic sensor for detecting presence of a magnetic field in different directions. For example, the sensor part 130 may include various sensors, such as a piezoelectric sensor, a proximity sensor, an illumination sensor, and the like.

The at least one sensor, included in the sensing part 130, may be disposed outside of a charging area. Here, the charging area may refer to an area, corresponding to the power transmitter 180, on an outer housing surface of the wireless power transmitter 100, and the wireless power receiver 200 may come into contact with the charging area or may be positioned within a predetermined distance from the charging area to receive power. For example, the at least one sensor may be disposed outside of a shielding material included in the power transmitter 180.

In the situation where the sensing part 130 is provided with a plurality of sensors, the sensors may be disposed symmetrical to each other with respect to the charging area. The first communicator 140 and the second communicator 150 may communicate with the wireless power receiver 200.

The first communicator 140 may communicate with the wireless power receiver 200 by a first communication method. The first communicator 140 may transmit signals, including data about device status, data about power consumption, etc., to the wireless power receiver 200, and may receive signals, including data about device status, data about power consumption, data about battery charging, etc., from the wireless power receiver 200.

The second communicator 150 may communicate with the wireless power receiver 200 by a second communication method which is different from the first communication method. The second communicator 150 may transmit signals, including data about device status, data about power consumption, etc., to the wireless power receiver 200, and may receive signals, including data about device status, data about power consumption, data about battery charging, etc., from the wireless power receiver 200.

The first communicator 140 and the second communicator 150 may further include a modulator-demodulator for modulating/demodulating the signals transmitted from the wireless power transmitter 100 and signals received from the wireless power receiver 200. The first communicator 140 and the second communicator 150 may further include a filter for filtering signals received from the wireless power receiver 200. In this situation, the filter may include a band-pass filter (BPF).

The first communication method may be an in-band communication method. For example, in the situation where the first communicator 140 performs communication by the in-band communication method, the first communicator 140 and the power transmitter 180 may be implemented as a single element, and the first communicator 140 may communicate with the wireless power receiver 200 through the transmitting coil 181.

The second communication method may be an out-of-band communication method. For example, in the situation where the second communicator 150 performs communication by the out-of-band communication method, the second communicator 150 and the power transmitter 180 may be implemented as separate elements, and the second communicator 150 may communicate with the wireless power receiver 200 through a separate communication module.

Depending on embodiments, the out-of-band communication method may be performed by using near-field communication techniques, such as BLUETOOTH, ZIGBEE, wireless LAN, Near Field Communication (NFC), and the like, but the present disclosure is not limited thereto.

A communication method used in the wireless power transmitter 100 may be changed to at least one of the first communication method and the second communication method, based on data about the wireless power receiver 200 and the like.

The controller 160 may be connected to each component of the wireless power transmitter 100. The controller 160 may transmit and receive signals with each component of the wireless power transmitter 100, and may control the overall operation of each component. The controller 160 may include a pulse width modulation (PWM) generator 160*a* for generating a PWM signal, and a driver 160*b* for generating a driving signal Sic based on the PWM signal and outputting the driving signal Sic to the wireless power driver 170.

The wireless power driver 170 may include at least one switching element for converting the AC voltage into the DC voltage. For example, in the situation where the switching element is an insulated gate bipolar transistor (IGBT), the driving signal Sic output by the driver 160*b* may be input to a gate terminal of the switching element.

In addition, the switching element, included in the wireless power driver 170, may perform a switching operation according to the driving signal Sic, and the DC voltage may be converted into the AC voltage by the switching operation of the switching element and may be output to the power transmitter 180.

The wireless power driver 170 may include an inverter including a plurality of switching elements. The power transmitter 180 may include different types of transmitting coils. The power transmitter 180 may include a plurality of first transmitting coils 181 for medium power transmission, and a second transmitting coil 182 for low power transmission.

The plurality of first transmitting coils 181 may be disposed adjacent to each other and may be disposed on the same plane. In this situation, the plurality of first transmitting coils 181 may be disposed so as not to overlap each other.

The second transmitting coil 182 may be disposed on a plane different from the plane on which the plurality of first transmitting coils 181 are disposed. For example, the second transmitting coil 182 may be disposed on an upper end of the plurality of first transmitting coils 181.

The second transmitting coil 182 may be disposed at the center of a region corresponding to the plurality of first transmitting coils 181. An area of the region, corresponding to the second transmitting coil 182 may be smaller than a region corresponding to the plurality of first transmitting coils 181. For example, a diameter of the region, corresponding to the second transmitting coil 182, may be smaller than a diameter of the region corresponding to the plurality of first transmitting coils 181.

A diameter of the regions corresponding to the plurality of first transmitting coils 181 and/or the second transmitting coil 182 may correspond to a diameter of a receiving coil 281. For example, the diameter of the region, corresponding to the plurality of first transmitting coils 181, may correspond to the diameter of the receiving coil for receiving medium power.

In addition, the diameter of the region corresponding to the second transmitting coil 182 may correspond to a diameter of the receiving coil for receiving low power. The plurality of first transmitting coils 181 and/or the second transmitting coil 182 may be formed with wires wound a plurality of turns. Here, the wires may be litz wires formed by twisting a plurality of insulated conductive wires.

For example, the wires, forming the plurality of first transmitting coils 181 and/or the second transmitting coil 182, may be litz wires formed by winding 105 strands of an enamel copper wire having a diameter of 0.008 mm. In this situation, the wire, forming each of the plurality of first transmitting coils 181, may be stacked, for example, in multiple layers and may be wound a plurality of turns in each of the multiple layers. Each of the plurality of first transmitting coils 181 may be formed with one wire.

Furthermore, the wire, forming the second transmitting coil 182, may be wound a plurality of turns, for example, in a single layer. The plurality of first transmitting coils 181 and/or the second transmitting coil 182 may have a round shape or a circular sector shape, or a polygonal shape such as a triangular shape or a rectangular shape, but its shape is not limited thereto.

The plurality of first transmitting coils 181 and the second transmitting coil 182 are spaced apart from the receiving coil 281 included in the wireless power receiver 200, thus having a high leakage inductance and a low coupling factor, with low transmission efficiency. In order to solve the problem, the power transmitter 180 included in the wireless power transmitter 100 according to various embodiments of the present disclosure may further include a capacitor element connected to the plurality of first transmitting coils 181 and/or the second transmitting coil 182.

For example, a plurality of capacitor elements may be connected in series to each of the first transmitting coils 181 and the second transmitting coil 182; and depending on embodiments, the plurality of capacitor elements may be connected in parallel to each of the first transmitting coils 181 and the second transmitting coil 182, to form a resonant circuit.

The power transmitter 180 may determine a resonant frequency for power transmission. The resonant frequency may be determined by the following Equation 1.

$$f = \frac{1}{2\pi\sqrt{LC}}$$ [Equation 1]

The resonant frequency f may be determined by an inductance (L) and a capacitance (C) of each of the plurality of first transmitting coils 181 and the second transmitting coil 182. For example, the inductance (L) may be determined based on the number of turns of each of the plurality of first transmitting coils 181 and the second transmitting coil 182 and the like, and the capacitance (C) may be determined based on an area of each of the plurality of first transmitting coils 181 and the second transmitting coil 182, and the like.

By having the capacitor elements connected to each of the plurality of first transmitting coils 181 and the second transmitting coil 182, the power transmitter 180 may determine a resonant frequency for power transmission.

The power transmitter 180 may further include a shielding material disposed on one side of the plurality of first transmitting coils 181 and shielding a magnetic field. The shielding material may include a ferrite containing one or a combination of two or more of elements selected from a group consisting of Co, Fe, Ni, B, Si, and the like. The shielding material, disposed on one side of the plurality of first transmitting coils 181, may shield leakage of a magnetic field and may maximize orientation of the magnetic field.

The shielding material may be made of a soft magnetic material which may be easily demagnetized and has a low hysteresis loss. The shielding material may be greater than an area of the plurality of first transmitting coils 181, to reduce magnetic field leakage and to maximize orientation of the magnetic field.

The shielding material may have a plurality of projecting surfaces. For example, the plurality of projecting surfaces may be surrounded by an inner circumference of each of the plurality of first transmitting coils 181. In this situation, by providing the plurality of projecting surfaces surrounded by the inner circumference of each of the plurality of first transmitting coils 181, a magnetic flux of a magnetic field, which leaks without being directed toward the receiving coil 281, may be reduced, and a magnetic flux of a magnetic field directed toward the receiving coil 281 is increased, such that performance of power transmission may be improved.

The controller 160 may calculate a resonant frequency of each of the plurality of first transmitting coils 181 and the second transmitting coil 182. By controlling a current to flow to either the plurality of first transmitting coils 181 or the second transmitting coil 182, the controller 160 may calculate a resonant frequency of the current-flowing transmitting coil.

The controller 160 may transmit and receive signals through at least one of the plurality of first transmitting coils 181 and the second transmitting coil 182 included in the power transmitter 180. The controller 160 may control each component of the wireless power transmitter 100 to output an object detection signal for determining the presence of an object, located in the charging area, through at least one of the plurality of first transmitting coils 181 and the second transmitting coil 182. Here, the charging area may refer to an area, corresponding to the power transmitter 180, on an outer housing surface of the wireless power transmitter 100, and the wireless power receiver 200 may come into contact with the charging area or may be positioned within a predetermined distance from the charging area to receive power.

For example, a medium power charging area may be an area corresponding to the plurality of first transmitting coils 181. For example, a low power charging area may be an area corresponding to the second transmitting coil 182.

The object detection signal may be an analog ping (AP) signal having a very short pulse width. Once the object detection signal is output, the controller 160 may determine whether there is an object in the charging area based on a variation in current flowing through the plurality of first transmitting coils 181 and/or the second transmitting coil 182.

The controller 160 may control each component of the wireless power transmitter 100 to output a receiver detection signal for operating the wireless power receiver 200 in an awake state through the plurality of first transmitting coils 181 and/or the second transmitting coil 182. The receiver detection signal may be a digital ping (DP) signal. The digital ping (DP) signal may have a greater duty cycle than the analog ping (AP) signal, to attempt to establish communication with the wireless power receiver 200.

Furthermore, the controller 160 may receive a response signal to the receiver detection signal, output from the wireless power receiver 200, through the plurality of first transmitting coils 181 and/or the second transmitting coil 182. For example, the wireless power receiver 200 may modulate the DP signal, and may transmit the modulated DP signal as a response signal to the wireless power transmitter 100.

Based on the response signal to the receiver detection signal, the controller 160 may determine whether the object, located in the charging area, is the wireless power receiver 200. For example, the controller 160 may obtain data in digital form by demodulating the modulated DP signal received as the response signal, and may determine whether the object, located in the charging area, is the wireless power receiver 200 based on the obtained data.

The controller 160 may calculate a quality factor (Q) of the plurality of first transmitting coils 181 and/or the second transmitting coil 182. For example, the controller 160 may calculate the quality factor (Q) of the plurality of first transmitting coils 181 and/or the second transmitting coil 182 based on a voltage applied to the plurality of first transmitting coils 181 and/or the second transmitting coil 182 through the sensing part 130.

Specifically, in the situation where a frequency sweeps from a lower frequency to a high frequency in an operating frequency (available frequency) band, a voltage V1 applied to the coils and the capacitor is generally not changed even when the frequency sweep occurs, but the voltage may be reduced somewhat at a time when the object is located in the charging area. However, a voltage V2 applied to both ends of the coils may gradually rise and then drop when the frequency sweep occurs.

The controller 160 may calculate the quality factor (Q) of the plurality of first transmitting coils 181 and/or the second transmitting coil 182 by using the following Equation 2.

$$Q = \frac{V2}{V1}$$ [Equation 2]

The controller 160 may communicate with the wireless power receiver 200 through at least one of the first communicator 140 and the second communicator 150. For example, in the situation where the first communicator 140 performs communication by the in-band communication method, the controller 160 may transmit and receive signals including data with the wireless power receiver 200 through the second transmitting coil 182.

For example, in the situation where the second communicator 150 performs communication by the out-of-band communication method, the controller 160 may transmit and receive signals including data with the wireless power receiver 200 through a separate communication module. By controlling each component of the wireless power transmitter 100, the controller 160 may transmit power to the wireless power receiver 200 through the power transmitter 180.

In the present disclosure, signal transmission through the plurality of first transmitting coils 181 and/or the second transmitting coil 182 may be used interchangeably with power transmission through the plurality of first transmitting coils 181 and/or the second transmitting coil 182. For example, if the receiver detection signal is output through the plurality of first transmitting coils 181 and/or the second transmitting coil 182, it can be understood that power for operating the wireless power receiver 200 in an awake state is transmitted to the wireless power receiver 200.

The controller 160 may transmit a signal to the wireless power receiver 200 and may receive a response signal to the signal from the wireless power receiver 200, through at least one of the plurality of first transmitting coils 181 and the second transmitting coil 182.

Based on data received through at least one of the first communicator 140 and the second communicator 150, the controller 160 may identify a type of the receiving coil 281. Here, the type of the receiving coil 281 may include, for example, a first type being a medium power charging type and a second type being a low power charging type.

For example, the controller 160 may identify the type of the receiving coil 281 based on power class data of the wireless power receiver 200, which is received from the wireless power receiver through the first communicator 140. Here, the power class may indicate, for example, received power of the wireless power receiver 200. For example, the controller 160 may identify a charging type of the wireless power receiver 200 based on the power class data received from the wireless power receiver 200. In this situation, the controller 160 may identify the type of the receiving coil 281 based on the charging type of the wireless power receiver 200.

For example, if the wireless power receiver 200 uses a medium power charging type, the controller 160 may identify that the type of the receiving coil 281 is the first type; and if the wireless power receiver 200 uses a low power charging type, the controller 160 may identify that the type of the receiving coil 281 is the second type.

According to the type of the receiving coil 281, the controller 160 may determine at least one of the plurality of first transmitting coils 181 and the second transmitting coil 182 as the coil for power transmission. For example, if the type of the receiving coil 281 is the first type, the controller 160 may determine the plurality of first transmitting coils 181 as the coil for power transmission. Further, if the type of the receiving coil 281 is the first type, the controller 160 may also determine both the plurality of first transmitting coils 181 and the second transmitting coil 182 as the coil for power transmission.

For example, if the type of the receiving coil 281 is the second type, the controller 160 may determine the second transmitting coil 182 as the coil for power transmission. For example, based on data received from the wireless power receiver 200, the controller 160 may check a result of power transmitted through the plurality of first transmitting coils 181 and/or the second transmitting coil 182.

For example, if the type of the receiving coil 281 is the second type, the controller 160 may transmit power through the second transmitting coil 182. In this situation, the controller 160 may receive data on power, received by the wireless power receiver 200, through at least one of the first communicator 140 and the second communicator 150, and may check a result of power transmitted through the second transmitting coil 182 based on the data on the received power.

In this situation, the data on the received power may include, for example, the power received by the wireless power receiver 200, data about the voltage applied to the receiving coil 281, or data on a request for an increase in transmitted power. For example, if a voltage applied to the receiving coil 281 is less than a predetermined target voltage (e.g., 12V), the wireless power receiver 200 may transmit a signal, including a data on a request for an increase in the transmitted power, to the wireless power transmitter 100.

Based on the data on the received power, the controller 160 may check whether the voltage applied to the receiving coil 281 is less than the predetermined target voltage, as a result of power transmitted through the second transmitting coil 182. If a voltage applied to the receiving coil 281 is less than the predetermined target voltage (e.g., 12V), the controller 160 may control the wireless power driver 170 to increase a value of a voltage applied to the second transmitting coil 182.

In this situation, if a voltage applied to the second transmitting coil 182 reaches a preset reference voltage (e.g., 20V) before the voltage applied to the receiving coil 281 reaches the predetermined target voltage (e.g., 12V), the controller 160 may determine that it is difficult to transmit power, satisfying predetermined criteria, through the second transmitting coil 182.

Furthermore, if a voltage applied to the second transmitting coil 182 reaches the preset reference voltage (e.g., 20V) before the voltage applied to the receiving coil 281 reaches the predetermined target voltage (e.g., 12V), the controller 160 may determine that the receiving coil 281 is located at a position spaced apart by a distance, greater than or equal to a predetermined distance, from the center of a region corresponding to the second transmitting coil 182.

For example, upon determining that it is difficult to transmit power, satisfying predetermined criteria, through the second transmitting coil 182, the controller 160 may determine at least one of the second transmitting coil 182 or the plurality of first transmitting coils 181 as a coil for power transmission. In this situation, the controller 160 may select at least one of the plurality of first transmitting coils 181 based on a position of the wireless power receiver 200 in the charging area.

The controller 160 may determine the position of the wireless power receiver 200 in the charging area. The controller 160 may determine a moving direction corresponding to the position of the wireless power receiver 200 in the charging area. The controller 160 may determine the position of the wireless power receiver 200 in the charging area through the plurality of first transmitting coils 181.

The controller 160 may transmit signals to the wireless power receiver 200 through any one of the plurality of first transmitting coils 181 by sequentially selecting each of the plurality of first transmitting coils 181, and may receive response signals to the signals transmitted through each of the plurality of transmitting coils 181. For example, the controller 160 may transmit a signal to the wireless power receiver 200 through any one of the plurality of first transmitting coils 181, and may receive a response signal to the transmitted signal. In this situation, upon receiving the response signal to the transmitted signal, the controller 160 may transmit a signal to the wireless power receiver 200 through another one of the plurality of transmitting coils 181.

For example, the controller 160 may transmit a signal to the wireless power receiver 200 through each of the plurality of first transmitting coils 181, and may receive a response signal including data on a signal strength of the signal transmitted through each of the plurality of first transmitting coils 181.

Further, the controller 160 may determine a position of the wireless power receiver 200 based on the data included in the response signal received from the wireless power receiver 200. For example, the controller 160 may determine that the wireless power receiver 200 is located in a region corresponding to the first transmitting coil 181, through which a signal having a highest signal strength is transmitted, among signal strengths of signals transmitted through each of the plurality of first transmitting coils 181.

For example, the controller 160 may calculate a vector for each of the plurality of transmitting coils 181 based on the signal strengths of the signals transmitted through each of the plurality of first transmitting coils 181.

The controller 160 may determine a direction, corresponding to each of the plurality of first transmitting coils 181, as a direction of a vector. In this situation, a difference in angle between vectors for each of the plurality of first transmitting coils 181 may be determined based on a number of first transmitting coils 181 included in the power transmitter 180. For example, if the power transmitter 180 includes three first transmitting coils 181, a difference in angle between adjacent vectors may be 120 degrees, and if the power transmitter 180 includes four first transmitting coils 181, a difference in angle between adjacent vectors may be 90 degrees.

In addition, the controller 160 may determine a magnitude of a vector based on the data included in the response signals to the signals transmitted through each of the plurality of first transmitting coils 181. For example, the controller 160 may determine signal strengths of signals, received by the wireless power receiver 200 after being transmitted through each of the plurality of first transmitting coils 181, as the magnitudes of vectors for each of the plurality of first transmitting coils 181.

Further, the controller 160 may determine a position of the wireless power receiver 200 in the charging area based on a vector sum, which is a sum of vectors for each of the plurality of first transmitting coils 181. For example, the controller 160 may determine a direction of the vector sum as a direction in which the wireless power receiver 200 is spaced apart from the center of the charging area.

For example, the controller 160 may determine a magnitude of the vector sum as a degree of separation of the wireless power receiver 200 from the center of the charging area. In addition, the controller 160 may determine an opposite direction to the direction of the vector sum as a moving direction corresponding to the position of the wireless power receiver 200.

Moreover, based on the position of the wireless power receiver 200, the controller 160 may determine at least one first transmitting coil 181, corresponding to the position of the wireless power receiver 200, among the plurality of first transmitting coils 181. For example, the controller 160 may determine the first transmitting coil 181, through which the signal having the highest signal strength is transmitted, among the signal strengths of the signals transmitted through each of the plurality of first transmitting coils 181, as the first transmitting coil 181 corresponding to the position of the wireless power receiver 200. In this situation, if a difference between two highest signal strengths is within a predetermined reference value, the controller 160 may determine two first transmitting coils 181, corresponding to the two highest signal strengths, as the first transmitting coils 181 corresponding to the position of the wireless power receiver 200.

For example, the controller 160 may determine the first transmitting coil 181, corresponding to the direction of the vector sum of the vectors for each of the plurality of first transmitting coils 181, as the first transmitting coil 181 corresponding to the position of the wireless power receiver 200.

In addition, the controller 160 may determine a position of the wireless power receiver 200 in the charging area based on a sensing value sensed by sensors included in the sensing part 130. For example, the controller 160 may determine a position of the wireless power receiver 200 based on sensing values sensed by a plurality of magnetic sensors.

In this situation, the controller 160 may identify a magnetic sensor detecting a highest sensing value among maximum sensing values detected by the plurality of magnetic sensors, and may determine the first transmitting coil 181 corresponding to the identified magnetic sensor as the first transmitting coil 181 corresponding to the position of the wireless power receiver 200.

Furthermore, the controller 160 may determine a position of the wireless power receiver 200 based on the maximum sensing values detected by the plurality of magnetic sensors. In this manner, even when a magnetic field around the first transmitting coils 181 change periodically over time, the controller 160 may accurately determine the position of the wireless power receiver 200. For example, the controller 160 may determine the position of the wireless power receiver 200 based on sensing values detected by a plurality of piezoelectric sensors.

In this situation, the controller 160 may identify a piezoelectric sensor detecting a highest sensing value among maximum sensing values detected by the plurality of piezoelectric sensors, and may determine the first transmitting coil 181, corresponding to the identified piezoelectric sensor, as the first transmitting coil 181 corresponding to the position of the wireless power receiver 200.

Further, the controller 160 may also determine a position of the wireless power receiver 200 based on sensing values detected by, for example, a plurality of proximity sensors, a plurality of illumination sensors, and the like.

The wireless power transmitter 100 may further include an output unit. The output unit may include a display device such as a display, a light emitting diode (LED), etc., and/or an audio device such as a speaker, a buzzer, and the like.

The controller 160 may output a message, indicating the position of the wireless power receiver 200, through the output unit. The controller 160 may output a message, indicating the moving direction corresponding to the position of the wireless power receiver 200, through the output unit. For example, the controller 160 may output a message, indicating the moving direction corresponding to the position of the wireless power receiver 200, through a display device of the output unit.

For example, the controller 160 may output a message, indicating the moving direction corresponding to the position of the wireless power receiver 200, through an audio device of the output unit. For example, the controller 160 may transmit a signal, including data on the moving direction corresponding to the position of the wireless power receiver 200, to the wireless power receiver 200 through at least one of the first communicator 140 and the second communicator 150.

In addition, the wireless power transmitter 100 may further include a position determiner for determining a position of the power transmitter 180. The position determiner may include a driver for moving and/or rotating the plurality of first transmitting coils 181 and/or the second transmitting coil 182. The controller 160 may control the operation of the position determine based on the position of the wireless power receiver 200 in the charging area. Furthermore, the controller 160 may also stop power transmission based on values detected by the sensing unit 130.

Figure 3:
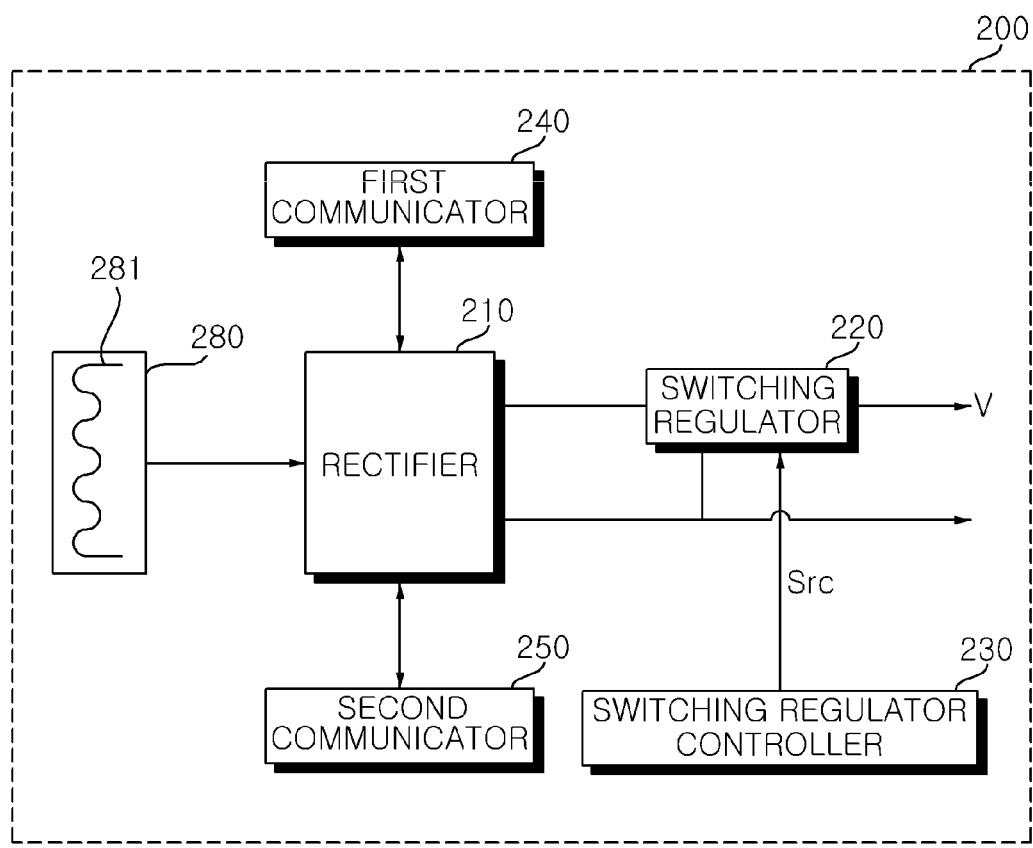
FIG. 3 is an internal block diagram of a wireless power receiver according to an embodiment of the present disclosure.

FIG. 3 is an internal block diagram of a wireless power receiver according to an embodiment of the present disclosure. Referring to FIG. 3, the wireless power receiver 200 may include a power receiver 280 configured to receive power wirelessly from the wireless power transmitter 100, a rectifier 210 configured to rectify the received power, a switching regular 220 configured to stabilize the rectified power, and/or a switching regulator controller 230 configured to control the switching regulator 220 to output operating power to a load.

In addition, the wireless power receiver 200 may further include a first communicator 240 and a second communicator 250 for communication with the wireless power transmitter 100. In this situation, the first communicator 240 may be the same as or similar to the first communicator 140 included in the wireless power transmitter 100. Further, the second communicator 250 may be the same as or similar to the second communicator 150 included in the wireless power transmitter 100.

For example, the wireless power receiver 200 may communicate with the wireless power transmitter 100 by the in-band communication method through the first communicator 240. For example, the wireless power receiver 200 may communicate with the wireless power transmitter 100 by the out-of-band communication method through the second communicator 250.

The power receiver 280 may receive power transmitted from the power transmitter 180. To this end, the power receiver 280 may receive at least one receiving coil 281. The receiving coil 281 may generate an induced electromotive force by a magnetic field produced by the plurality of first transmitting coils 181 and/or the second transmitting coil 182. Power generated by the induced electromotive force may be supplied to a load through the rectifier 210 and the switching regulator 220. For example, if the load is a battery, the power generated by the induced electromotive force may be used to charge the battery. In the present disclosure, description is given of an example in which the load, supplied with power through the rectifier 210 and the switching regulator 220, is a battery, but the present disclosure is not limited thereto.

The receiving coil 281 may be formed of a thin film having a conductive pattern on a printed circuit board (PCB). The receiving coil 281 has a closed loop shape and may be printed on a pad. The receiving coil 281 may be wound to have a polarity in the same direction.

The receiving coil 281 may be formed with a wire wound a plurality of turns. For example, the wire forming the receiving coil 281 may be a litz wire. Further, the receiving coil 281 may be formed with a plurality of wires, arranged in parallel with each other and wound a plurality of turns in a single layer. For example, one end and the other end of three wires, arranged in parallel with each other, may be electrically connected to each other, and the three wires may be wound side by side a plurality of turns. In other words, if the receiving coil 281 is formed with the plurality of wires wound side by side, the plurality of wires may be connected in parallel to each other.

A thickness of the wire forming the receiving coil 281 may be smaller than a thickness of wires forming the plurality of first transmitting coils 181 and/or the second transmitting coil 182. For example, the wire forming the receiving coil 281 may be a litz wire formed by winding 65 strands of an enamel copper wire having a diameter of 0.05 mm.

In addition, the wireless power receiver 200 may include a voltage detector configured to detect a voltage applied to the receiving coil 281 and/or a current detector configured to detect a current flowing through the receiving coil 281. For example, when power is received by the receiving coil 281, the wireless power receiver 200 may detect a voltage applied to the receiving coil 281 and/or a current flowing through the receiving coil 281.

In this situation, the wireless power receiver 200 may output a signal, including data on the voltage applied to the receiving coil 281, the current flowing through the receiving coil 281, the power received by the receiving coil 281, and the like, through any one of the first communicator 240 and the second communicator 250.

For example, if a voltage applied to the receiving coil 281 is less than a predetermined target voltage (e.g., 12V), the wireless power receiver 200 may transmit a signal, including data on a request for an increase in the transmitted power, to the wireless power transmitter 100. Furthermore, the wireless power receiver 200 may further include at least one capacitor to form a resonant circuit with the power receiver 280 included in the wireless power transmitter 200. In this situation, the capacitor may be connected in series or in parallel to the receiving coil 281.

The wireless power receiver 200 may further include a shielding material disposed at one side of the receiving coil 281 and shielding a leaking magnetic field. For example, the wireless power receiver 200 may include a shielding material which is the same as or similar to the shielding material of the wireless power transmitter 100.

The rectifier 210 may rectify the power received by the receiving coil 281. The rectifier 210 may include at least one diode. The switching regular 220 may supply the power, rectified by the rectifier 210, to a battery under the control of the switching regulator controller 230. For example, the switching regulator 220 may convert the power, rectified by the rectifier 210, into charging power (v) to be supplied to the battery and may output the charging power (v) to the battery.

The switching regulator controller 230 may control the charging power (v) to be output to the battery by outputting a regulator control signal Src to the switching regulator 220. The switching regulator 230 may regulate an output voltage by performing DC-DC conversion according to the regulator control signal Src. The switching regulator 220 may output the charging power (v), having a predetermined voltage, based on the regulator control signal Src.

The wireless power receiver 200 includes no separate processor, and the switching regulator 220 may be controlled by the switching regulator controller 230 when the switching regulator 220 converts the rectified charging power (v) to a voltage having a predetermined magnitude and outputs the charging power (v). In the situation where the wireless power receiver 200 includes no processor, hardware may have a simple structure and power consumption may be reduced.

Figure 4:
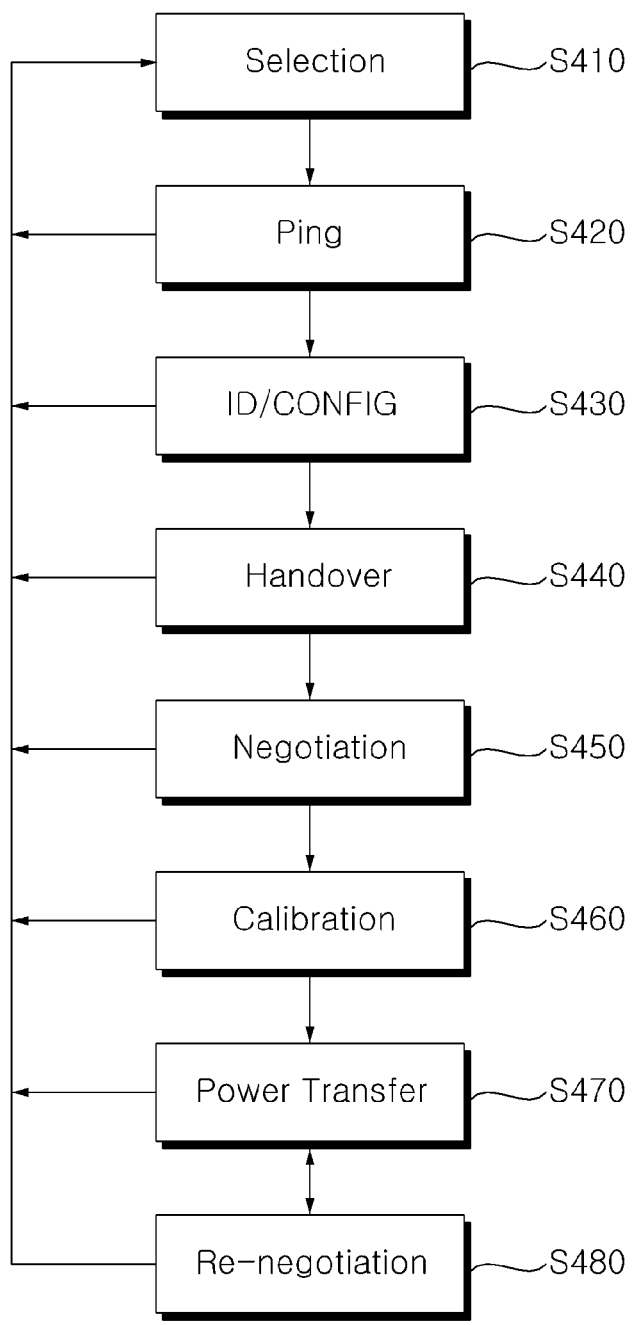
FIG. 4 is a flowchart illustrating a wireless power transfer method of a wireless power transmitter according to an embodiment of the present disclosure.

FIG. 4 is a flowchart illustrating a wireless power transfer method of a wireless power transmitter according to an embodiment of the present disclosure. Referring to FIG. 4, the wireless power transfer method may include a selection phase S410, a ping phase S420, an identification and configuration phase S430, a handover phase S440, a negotiation phase S450, a calibration phase S460, a power transfer phase S470, and a re-negotiation phase S480.

In the selection phase S410, the wireless power transmitter 100 may determine whether there is an object in the charging area. For example, in order to determine whether there is an object, the wireless power transmitter 100 may output an object detection signal (e.g., analog ping (AP) signal) through the transmitting coil 181, and may determine whether there is an object in the charging area based on the output object detection signal.

The wireless power transmitter 100 may output the object detection signal at predetermined intervals, for example, until it determines that there is an object in the charging area. In the selection phase S410, the wireless power transmitter 100 may determine, for example, whether there is a foreign object in the charging area. The foreign object (FO) may be a metal object including a coin, key, and the like.

In the selection phase S410, the wireless power transmitter 100 may continuously detect alignment or removal of the object in the charging area. In the selection phase (S410), upon determining that there is an object in the charging area, the wireless power transmitter 100 may proceed to the ping phase S420.

In the ping phase S420, the wireless power transmitter 100 may identify, for example, whether an object located in the charging area is the wireless power receiver 200, and may transmit a receiver detection signal (e.g., digital ping (DP) signal) for operating the wireless power receiver 200 in an awake state.

The wireless power transmitter 100 may receive, for example, a response signal to the receiver detection signal. For example, the wireless power receiver 200 may modulate the digital ping (DP) signal and may transmit the modulated DP signal as a response signal to the wireless power transmitter 100.

The wireless power transmitter 100 may determine whether an object, located in the charging area, is the wireless power receiver 200 based on the response signal to the receiver detection signal. For example, the wireless power transmitter 100 may obtain data in digital form by demodulating the modulated DP signal, which is received as the response signal, and may determine whether the object located in the charging area is the wireless power receiver 200 based on the obtained data.

Further, upon determining that the object located in the charging area is the wireless power receiver 200 in the ping phase S420, the wireless power receiver 100 may proceed to the identification and configuration phase S430. If the wireless power transmitter 100 does not receive the response signal in the ping phase S420, the procedure returns to the selection phase S410, such that the wireless power transmitter 100 may perform each operation in the selection phase S410.

In the identification and configuration phase S430, the wireless power transmitter 100 may control each component included therein to perform power transmission effectively based on, for example, data received from the wireless power receiver 200. In the identification and configuration phase S430, the wireless power transmitter 100 may receive, for example, identification data from the wireless power receiver 200. The identification data may include, for example, data showing the version of a contract for wireless power transfer, data for identifying the manufacturer of the wireless power receiver 200, data indicating the presence of a device identifier and an extended device identifier, authentication data, and the like.

In the identification and configuration phase S430, the wireless power transmitter 100 may receive, for example, power data from the wireless power receiver 200. The power data may include, for example, data about a maximum power of the wireless power receiver 200, data about a residual power, data about a power class, and the like. For example, based on the identification data and the power data, the wireless power transmitter 100 may identify the wireless power receiver 200 and may check a power state of the wireless power receiver 200.

For example, the wireless power transmitter 100 may perform authentication of the wireless power receiver 200 based on the authentication data received from the wireless power receiver 200. In addition, in the identification and configuration phase S430, the wireless power transmitter 100 may identify the wireless power receiver 200, and upon checking a power state of the wireless power receiver 200, the wireless power transmitter 100 may proceed to handover phase S430.

Furthermore, if the wireless power transmitter 100 does not receive the identification data and/or the power data in the identification and configuration phase S430, the procedure returns to the selection phase S410. In the handover phase S440, the wireless power transmitter 100 may determine, for example, whether to change a method of communication with the wireless power receiver 200.

For example, while communicating with the wireless power receiver 200 by the in-band communication method, the wireless power transmitter 100 may determine whether to maintain the in-band communication or to change a communication method to an out-of-band communication, based on the power data of the wireless power receiver 200 obtained in the identification and configuration phase S430.

In addition, the wireless power transmitter 100 may determine whether it is necessary to enter the negotiation phase S450 based on, for example, a negotiation field value received in the identification and configuration phase S430 or the handover phase S450. For example, upon determining that it is necessary to enter the negotiation phase S450, the wireless power transmitter 100 may perform foreign object detection (FOD) in the negotiation phase S450.

The wireless power transmitter 100 may determine whether to proceed to the calibration phase S460 based on, for example, the determination in the selection phase S410 and/or the negotiation phase S450 on the presence of the foreign object (FO) in the charging area. For example, upon determining that it is not necessary to enter the negotiation phase S450, the wireless power transmitter 100 may proceed to the power transfer phase S470.

If no foreign object (F) is detected, for example, in the selection phase S410 and/or the negotiation phase S450, the wireless power transmitter 100 may proceed to the power transfer phase S470 via the calibration phase in S460. Alternatively, if the foreign object (FO) is detected, for example, in the selection phase S410 and/or the negotiation phase S450, the procedure may return to the selection phase S410 without performing power transmission.

In the calibration phase S460, the wireless power transmitter 100 may calculate a power loss based on, for example, a difference between power transmitted by the wireless power transmitter 100 and power received by the wireless power receiver 200. In the power transfer phase S470, the wireless power transmitter 100 may transmit power to, for example, the wireless power receiver 200.

For example, upon succeeding in authentication of the wireless power receiver 200, the wireless power transmitter 100 may transmit power to the wireless power receiver 200. In the power transfer phase S470, upon receiving data about power control from the wireless power receiver 200, for example, during power transmission, the wireless power transmitter 100 may determine characteristics of power based on the received data about power control.

In the power transfer phase S470, for example, if the wireless power transmitter 100 receives unexpected data or fails to receive desired data, e.g., the data about power control, for a predetermined period of time (timeout), or if a violation of a pre-established power transfer contract occurs (power transfer contract violation) or charging is complete, the procedure returns to the selection phase S410.

Furthermore, in the power transfer phase S470, for example, if it is necessary to reconfigure the power transfer contract due to a change in the state of the wireless power transmitter 100 and/or the wireless power receiver 200, the wireless power transmitter 100 may proceed to the re-negotiation phase S480. In this situation, upon normally completing re-negotiation, the wireless power transmitter 100 may return to the power transfer phase S470.

Figure 5A:
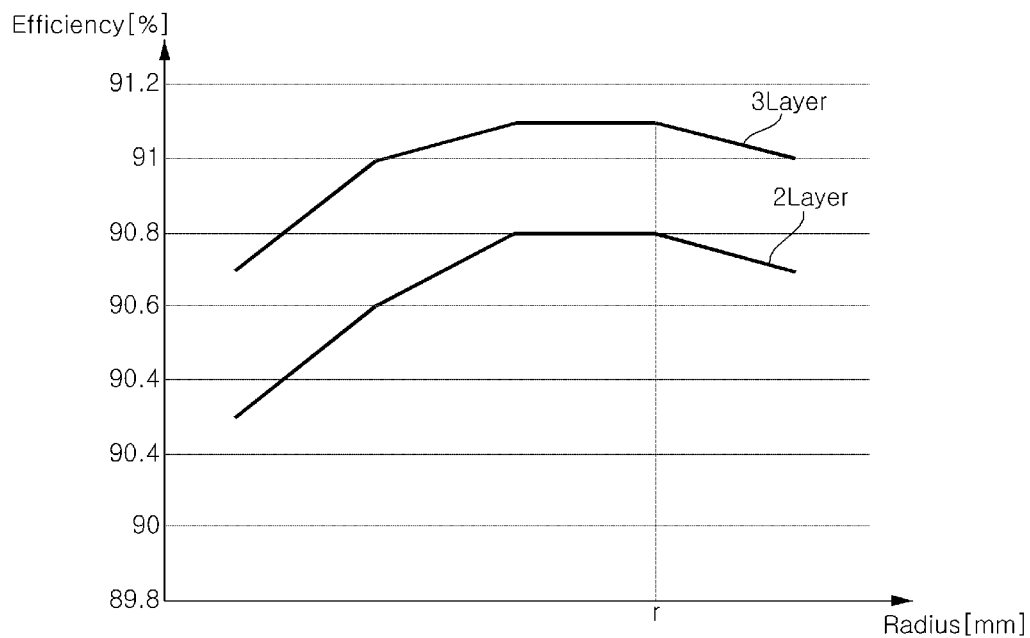
FIGS. 5A and 5B are diagrams referred to in explaining a stacked structure of a plurality of first transmitting coils according to various embodiments of the present disclosure.
Figure 5B:
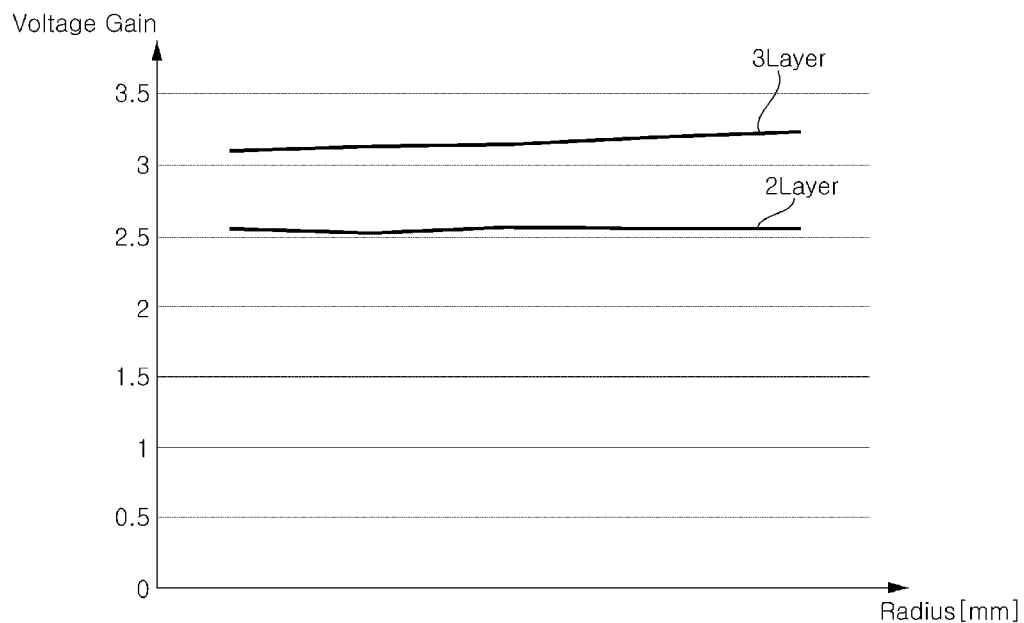

FIGS. 5A and 5B are diagrams referred to in explaining a stacked structure of a plurality of first transmitting coils according to various embodiments of the present disclosure. FIGS. 5A and 5B illustrate a graph showing power transmission and reception efficiency and a graph showing a voltage gain, respectively, according to a change in radius of a region corresponding to the plurality of first transmitting coils 181 when wires forming each of the plurality of first transmitting coils 181 are stacked in multiple layers.

In this situation, a total number of turns of the wires forming each of the plurality of first transmitting coils 181 is constant, and a number of turns of the wires wound in each of the plurality of layers may vary depending on the number of layers on which the wires are stacked.

Referring to FIG. 5A, it can be seen that power transmission and reception efficiency is improved when the wires forming each of the plurality of first transmitting coils 181 are stacked in three layers, compared to a situation where the wires are stacked in two layers. For example, when the wires are stacked in three layers compared to the situation where the wires are stacked in two layers, the power transmission and reception efficiency may increase by about 0.4%.

In this situation, it can be seen that as a radius of a region corresponding to the plurality of first transmitting coils 181 increases, the power transmission and reception efficiency increases; and if the radius increases to be greater than a predetermined size (r), the power transmission and reception efficiency decreases. In this situation, the predetermined size (r), which allows maximum power transmission and reception efficiency, of the radius of the region corresponding to the plurality of first transmitting coils 181 may correspond to a radius of a receiving coil 281 of a first type.

More preferably, if a difference between the radius of the region corresponding to the plurality of first transmitting coils 181 and the radius of the receiving coil 281 of the first type is less than 6% of a diameter of the first type receiving coil 281, maximum power transmission and reception efficiency may be achieved.

In addition, referring to FIG. 5B, it can be seen that a voltage gain increases when the wires forming each of the plurality of first transmitting coils 181 are stacked in three layers, compared to the situation where the wires are stacked in two layers. For example, when the wires are stacked in three layers, rather than two layers, the voltage gain may increase by about 25%.

As described above, when a total number of turns of the wires forming each of the plurality of first transmitting coils 181 is constant, if a number of layers on which the wires are stacked increases, a number of turns of the wires wound in each of the plurality of layers is reduced, such that a winding width of the plurality of first transmitting coils 181 may be reduced.

In this situation, it can be understood that when an outer diameter of the area corresponding to the plurality of first transmitting coils 181 is constant, a winding width of the plurality of first transmitting coils 181 is reduced as the number of layers on which the wires are stacked increases, such that an inner diameter of the area corresponding to the plurality of first transmitting coils 181 increases, and the voltage gain increases.

Figure 6A:
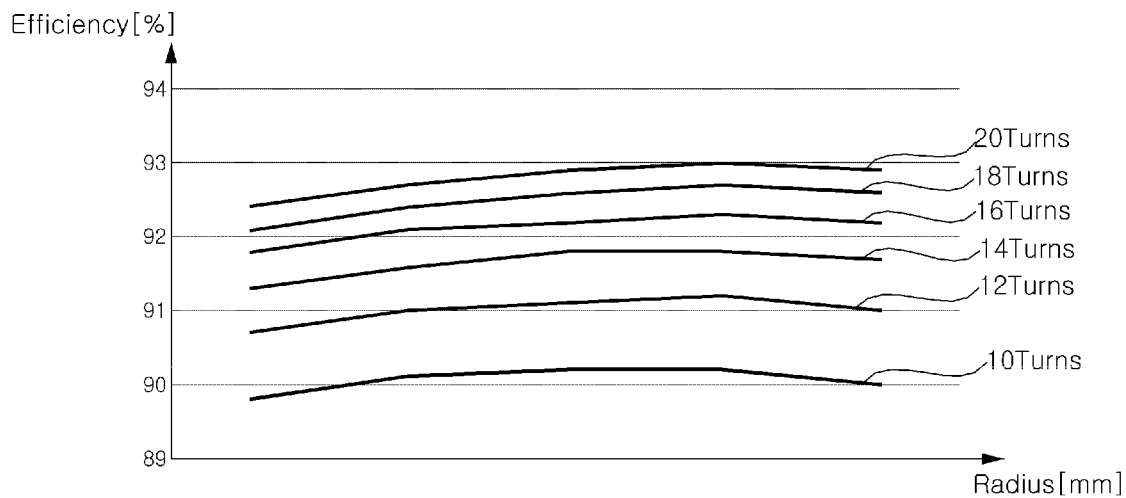
FIGS. 6A and 6B are diagrams referred to in explaining a radius and a number of turns of a plurality of first transmitting coils according to various embodiments of the present disclosure.
Figure 6B:
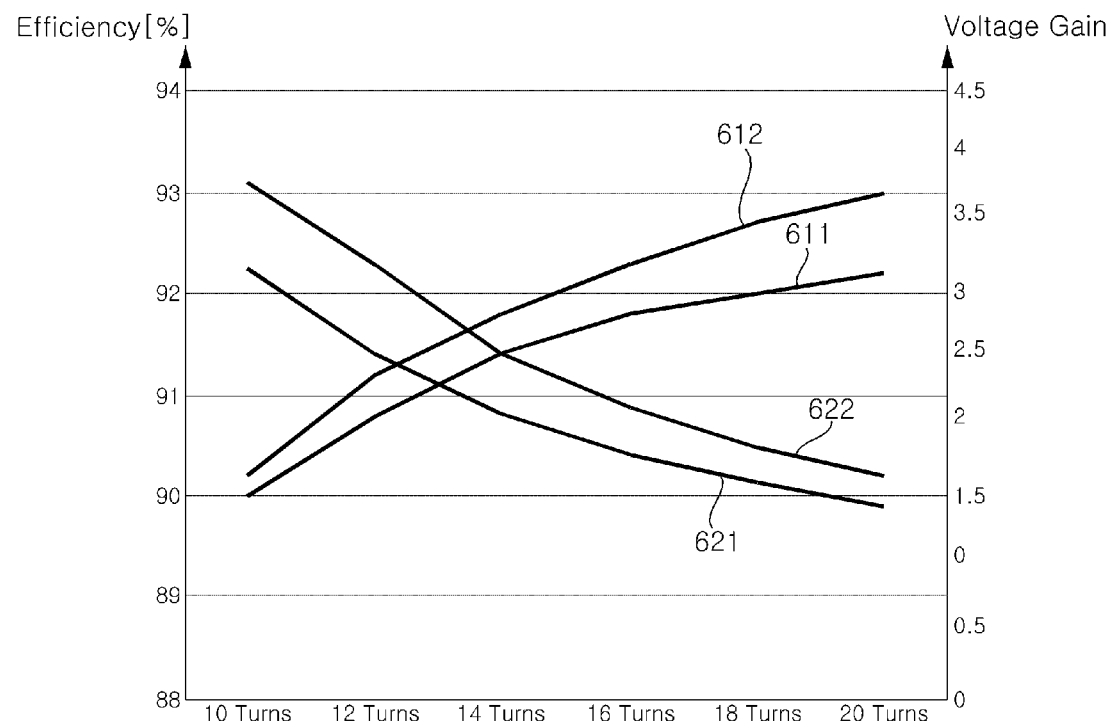

FIGS. 6A and 6B are diagrams referred to in explaining a radius and a number of turns of a plurality of first transmitting coils according to various embodiments of the present disclosure. FIG. 6A is a graph showing power transmission and reception efficiency according to a change in radius of the region corresponding to the plurality of first transmitting coils 181. In this situation, a number of layers on which the wires forming each of the plurality of first transmitting coils 181 is constant and a total number of turns may be different.

Referring to FIG. 6A, as illustrated in FIG. 5A, it can be confirmed that power transmission and reception efficiency increases as a radius of the region corresponding to the plurality of first transmitting coils 181 increases to a predetermined size, and if the radius increases to be greater than the predetermined size, the power transmission and reception efficiency decreases. In addition, as the total number of turns of the wires forming each of the plurality of first transmitting coils 181 increases, the power transmission and reception efficiency also increases.

FIG. 6B illustrates graphs 611 and 612 showing the power transmission and reception efficiency, and graphs 621 and 622 showing the voltage gain, according to the total number of turns of the wires forming each of the plurality of first transmitting coils 181 when the wires forming each of the plurality of first transmitting coils 181 are stacked in multiple layers.

Referring to FIG. 6B, it can be seen that power transmission and reception efficiency is improved as the total number of turns of the wires forming each of the plurality of first transmitting coils 181 increases. In this situation, the power transmission and reception efficiency is improved in the situation (612) where the wires forming each of the plurality of first transmitting coils 181 are stacked in three layers, compared to a situation (611) where the wires are stacked in two layers.

Furthermore, the voltage gain decreases as the total number of turns of the wires forming each of the plurality of first transmitting coils 181 increases. That is, as the total number of turns of the wires increases, the inductance of each of the plurality of first transmitting coils 181 may increase and the voltage gain may decrease. In addition, it can also be seen that the voltage gain increases in the situation (622) where the wires forming each of the plurality of first transmitting coils 181 are stacked in three layers, compared to the situation (621) where the wires are stacked in two layers.

According to various embodiments of the present disclosure based on the above results, the plurality of first transmitting coils 181 may have a total of 14 to 18 turns wound in multiple layers. More preferably, the plurality of first transmitting coils 181 may have four turns wound in each of four layers, to have 16 turns in total. In this situation, the plurality of first transmitting coils 181 may have an inductance of 38 μH to 40 μH.

Figure 7A:
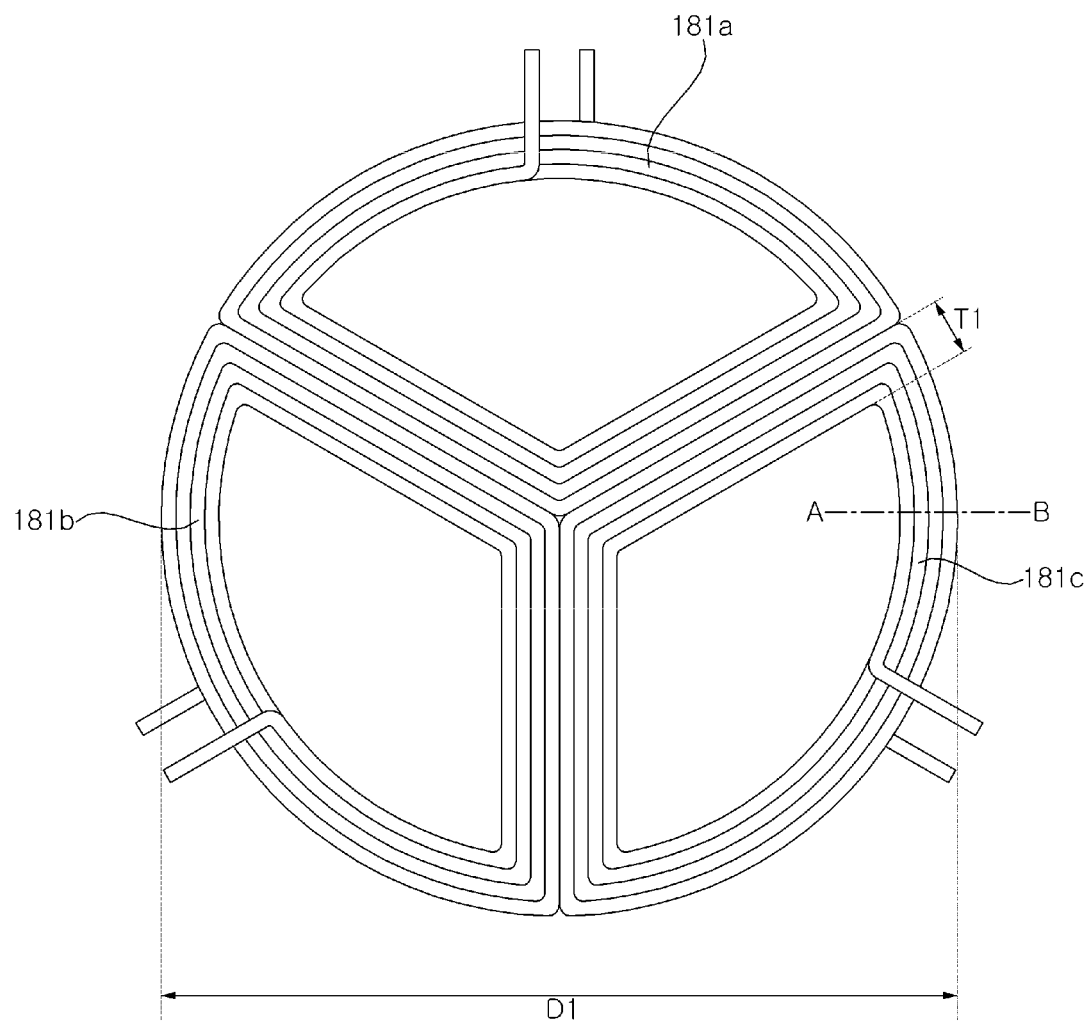
FIGS. 7A to 7C are diagrams referred to in explaining a structure of a plurality of first transmitting coils according to various embodiments of the present disclosure.
Figure 7B:
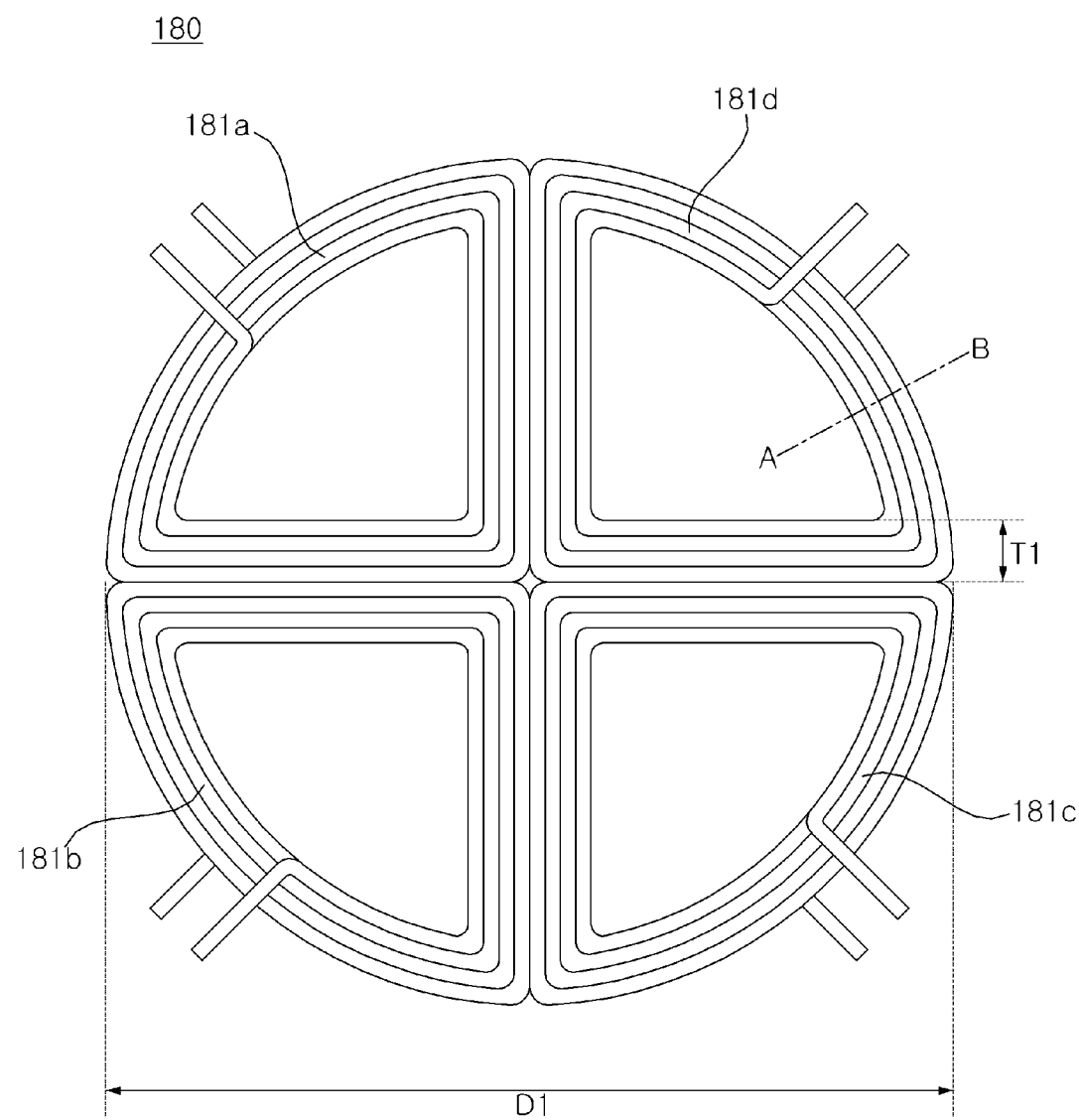
Figure 7C:
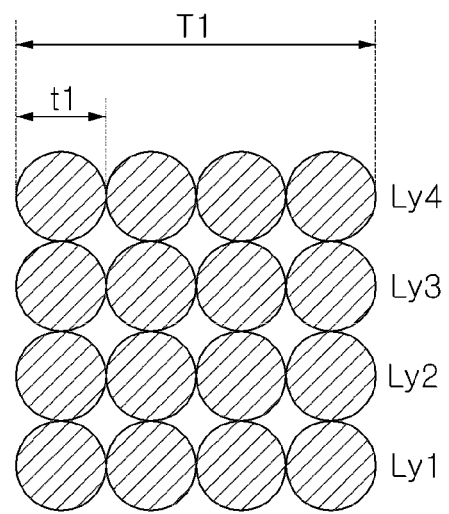

FIGS. 7A to 7C are diagrams referred to in explaining a structure of a plurality of first transmitting coils according to various embodiments of the present disclosure. FIGS. 7A and 7B are plan views of the plurality of first transmitting coils 181.

Referring to FIG. 7A, the power transmitter 180 may include three first transmitting coils 181*a*, 181*b* and 181*c* formed to convert a current to magnetic flux. The three first transmitting coils 181*a*, 181*b* and 181*c* may be disposed adjacent to each other or may be disposed on the same plane.

As illustrated in FIGS. 7A and 7B, the first transmitting coils 181*a*, 181*b* and 181*c* have a circular sector shape with the same radius and arc, and the overall shape of the first transmitting coils 181*a*, 181*b* and 181*c* is a circle with a plurality of circular sections, but the present disclosure is not limited thereto.

A medium-power charging area may be an area corresponding to the first transmitting coils 181*a*, 181*b* and 181*c*. An outer diameter D1 of the area corresponding to the plurality of first transmitting coils 181 may correspond to a diameter of the first type receiving coil 281 included in the wireless power receiver 200.

Each of the first transmitting coils 181*a*, 181*b* and 181*c* may be formed with a wire wound a plurality of turns. Here, the wire may be a litz wire.

Wires forming each of the first transmitting coils 181*a*, 181*b* and 181*c* may be stacked in multiple layers, and may be wound a plurality of turns in each of the multiple layers. Further, a winding width T1 of each of the first transmitting coils 181*a*, 181*b* and 181*c* may be determined according to a width of the wires and a number of turns of the wires wound in each of the multiple layers.

Referring to FIG. 7B, the power transmitter 180 may also include four first transmitting coils 181*a*, 181*b*, 181*c* and 181*d*. In the present disclosure, description is given of an example in which the power transmitter 180 includes three first transmitting coils 181*a*, 181*b* and 181*c*, but the present disclosure is not limited thereto.

FIG. 7C is a cross-sectional view of any one of the plurality of first transmitting coils 181. Referring to FIG. 7C, a wire forming any one of the plurality of first transmitting coils 181, is wound four turns in each of four layers Ly1 to Ly4, to be wound 16 turns in total.

In the situation where the wire forming each of the plurality of first transmitting coils 181 is wound four turns in each of the four layers Ly1 to Ly4, the winding width T1 of the plurality of first transmitting coils 181 may be four times the width t1 of the wire. In this situation, the number of layers on which the wire forming the plurality of first transmitting coils 181, the number of turns of the wire wound in each layer, etc. may be changed to various values according to various embodiments of the present disclosure.

Figure 8A:
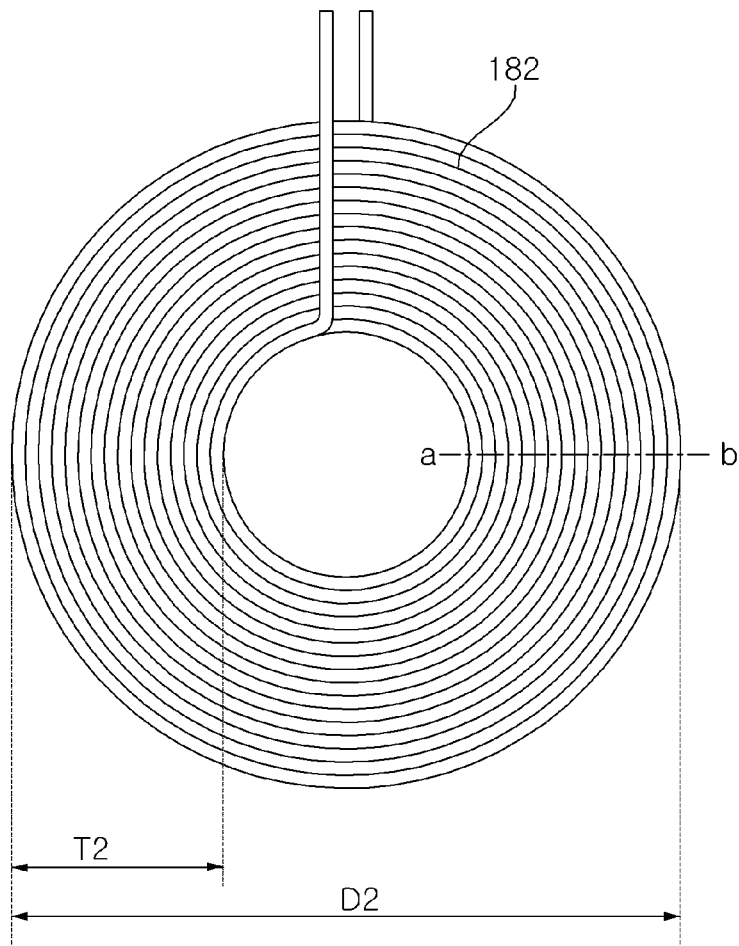
FIGS. 8A and 8B are diagrams referred to in explaining a structure of a second transmitting coil according to various embodiments of the present disclosure.
Figure 8B:
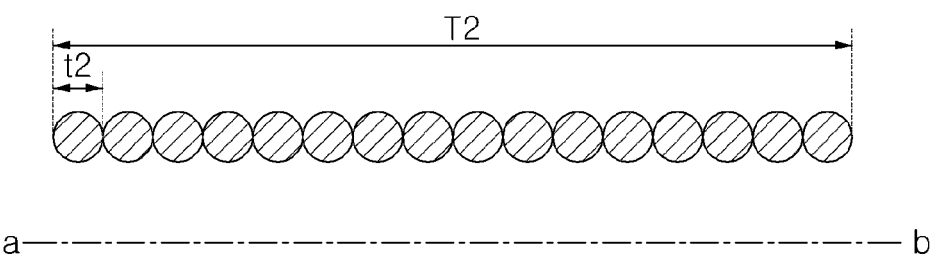

FIGS. 8A and 8B are diagrams referred to in explaining a structure of a second transmitting coil according to various embodiments of the present disclosure. FIG. 8A illustrates a plan view of the second transmitting coil 182, and FIG. 8B is a cross-sectional view of the second transmitting coil 182.

Referring to FIGS. 8A and 8B, the second transmitting coil 182 may be formed with a wire wound a plurality of turns. Here, the wire may be a litz wire. As illustrated in FIGS. 8A and 8B, the second transmitting coil 182 has a round shape, but the present disclosure is not limited thereto, and may also have a polygonal shape such as a triangular or rectangular shape.

A low-power charging area may be an area corresponding to the second transmitting coil 182. An outer diameter D2 of the area corresponding to the second transmitting coil 182 may correspond to a diameter of a second type receiving coil 281 included in the wireless power receiver 200 for low power reception.

A wire forming the second transmitting coil 182 may be wound a plurality of turns in a single layer. A winding width T2 of the second transmitting coil 182 may be determined according to a thickness t2 and a number of turns of the wire.

As illustrated in FIG. 8B, if the wire forming the second transmitting coil 182 is wound 16 turns in the single layer, the winding width T2 of the second transmitting coil 182 may be 16 times the thickness t2 of the wire. In this situation, the second transmitting coil 182 may have an inductance of 17 μH to 19 μH.

Figure 9A:
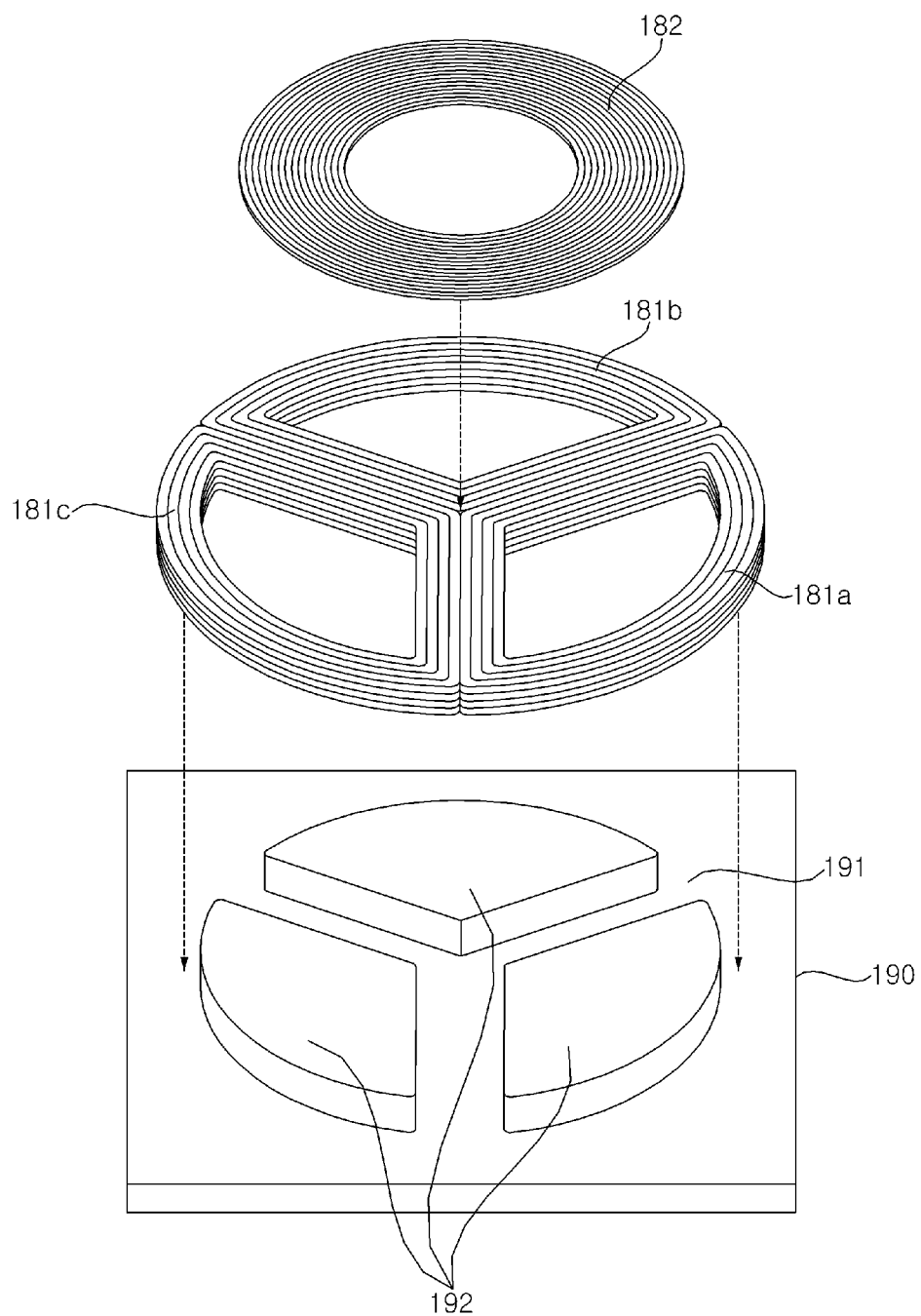
FIGS. 9A to 9C are diagrams referred to in explaining a structure of a power transmitter including a plurality of first transmitting coils and a second transmitting coil according to various embodiments of the present disclosure.
Figure 9B:
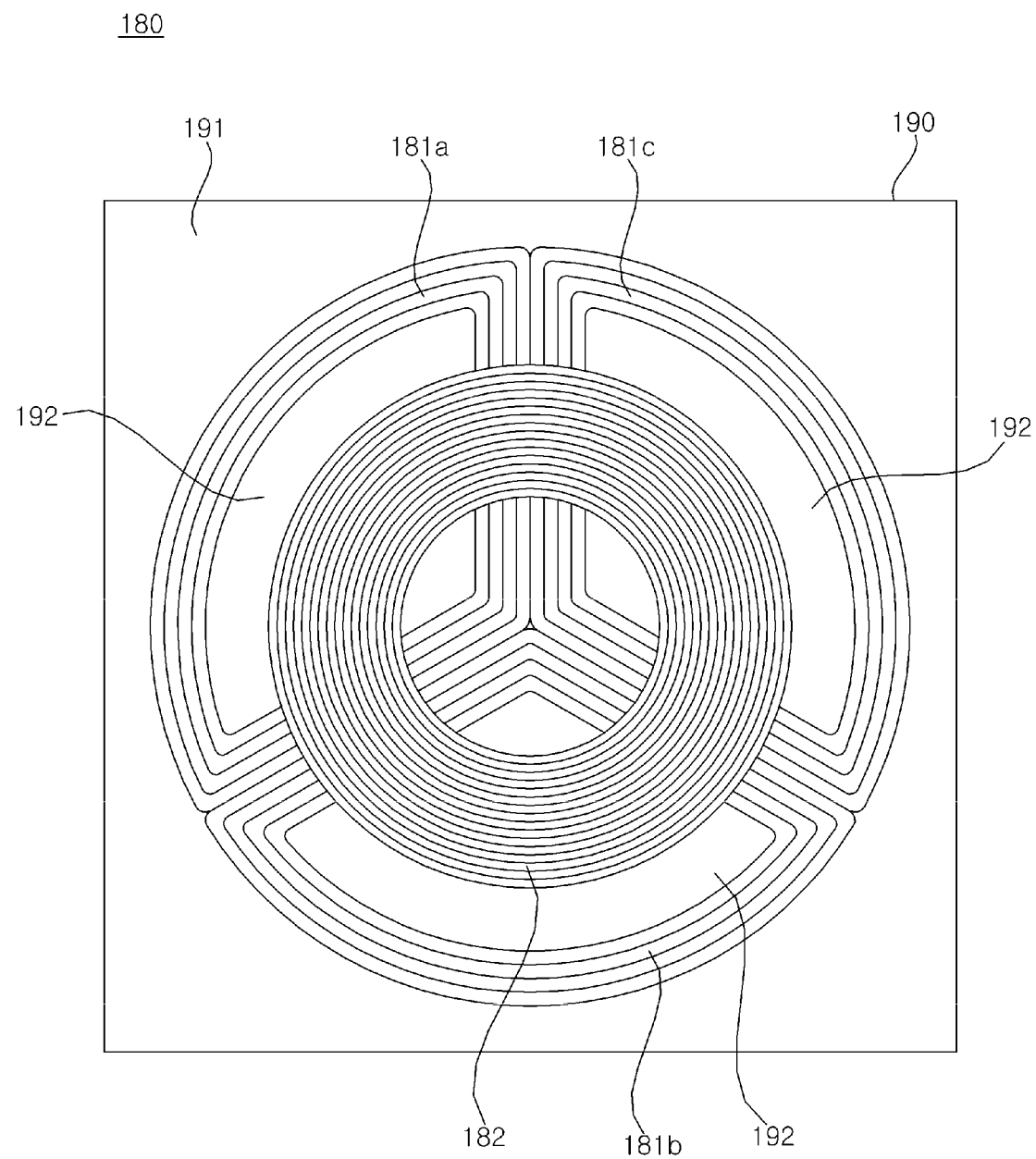
Figure 9C:
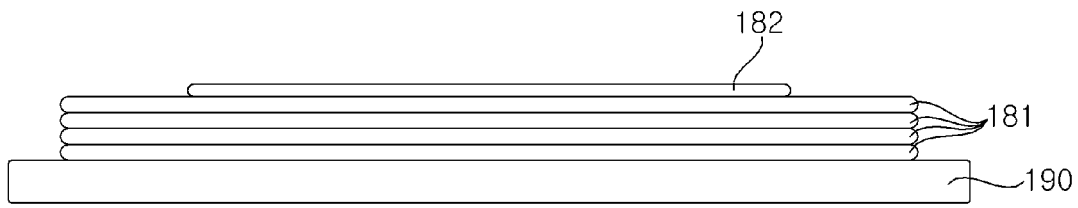

FIGS. 9A to 9C are diagrams referred to in explaining a structure of a power transmitter including a plurality of first transmitting coils and a second transmitting coil according to various embodiments of the present disclosure. FIG. 9A is an exploded perspective view of the power transmitter according to an embodiment of the present disclosure; FIG. 9B is a plan view of the power transmitter according to an embodiment of the present disclosure; and FIG. 9C is a side view of the power transmitter according to an embodiment of the present disclosure.

Referring to FIGS. 9A to 9C, the power transmitter 180 may include the plurality of first transmitting coils 181, the second transmitting coil 182 and/or a shielding material 190. The shielding material 190 may have a receiving surface 191, on which the plurality of first transmitting coils 181 are disposed, and a plurality of projecting surfaces 192 surrounded by an inner circumference of the plurality of first transmitting coils 181.

If a region corresponding to the plurality of first transmitting coils 181 has a round shape, the shielding material 190 may also have a round shape. An area of the shielding material 190 may be greater than an area of the region corresponding to the plurality of first transmitting coils 181.

The plurality of first transmitting coils 181 may be disposed adjacent to each other and may be disposed on an upper end of the shielding material 190. In this situation, the plurality of first transmitting coils 181 may be disposed so as not to overlap each other.

The plurality of projecting surfaces 192 may be inserted into each of an inner region of the plurality of first transmitting coils 181. The second transmitting coil 182 may be disposed on an upper end of the plurality of first transmitting coils 181 and may be disposed at the center of the region corresponding to the plurality of first transmitting coils 181. An area of a region corresponding to the second transmitting coil 182 may be smaller than an area of the region corresponding to the plurality of first transmitting coils 181.

Figure 10:
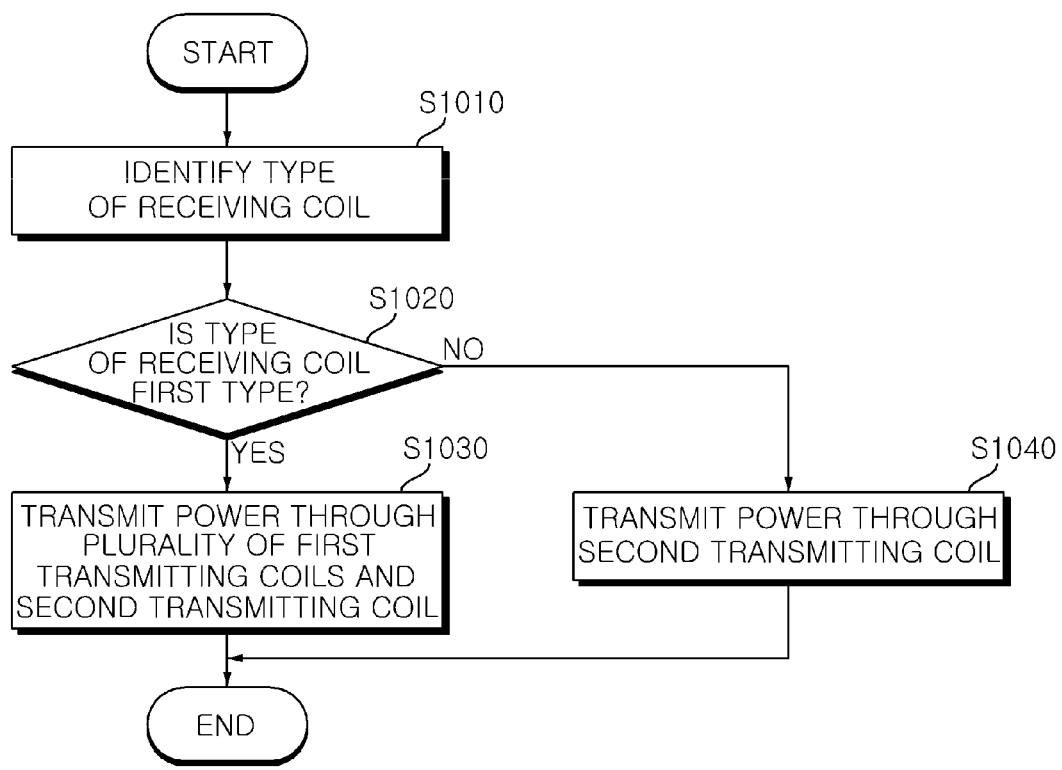
FIG. 10 is a flowchart illustrating an operation method of a wireless power transmitter according to an embodiment of the present disclosure.
Figure 11A:
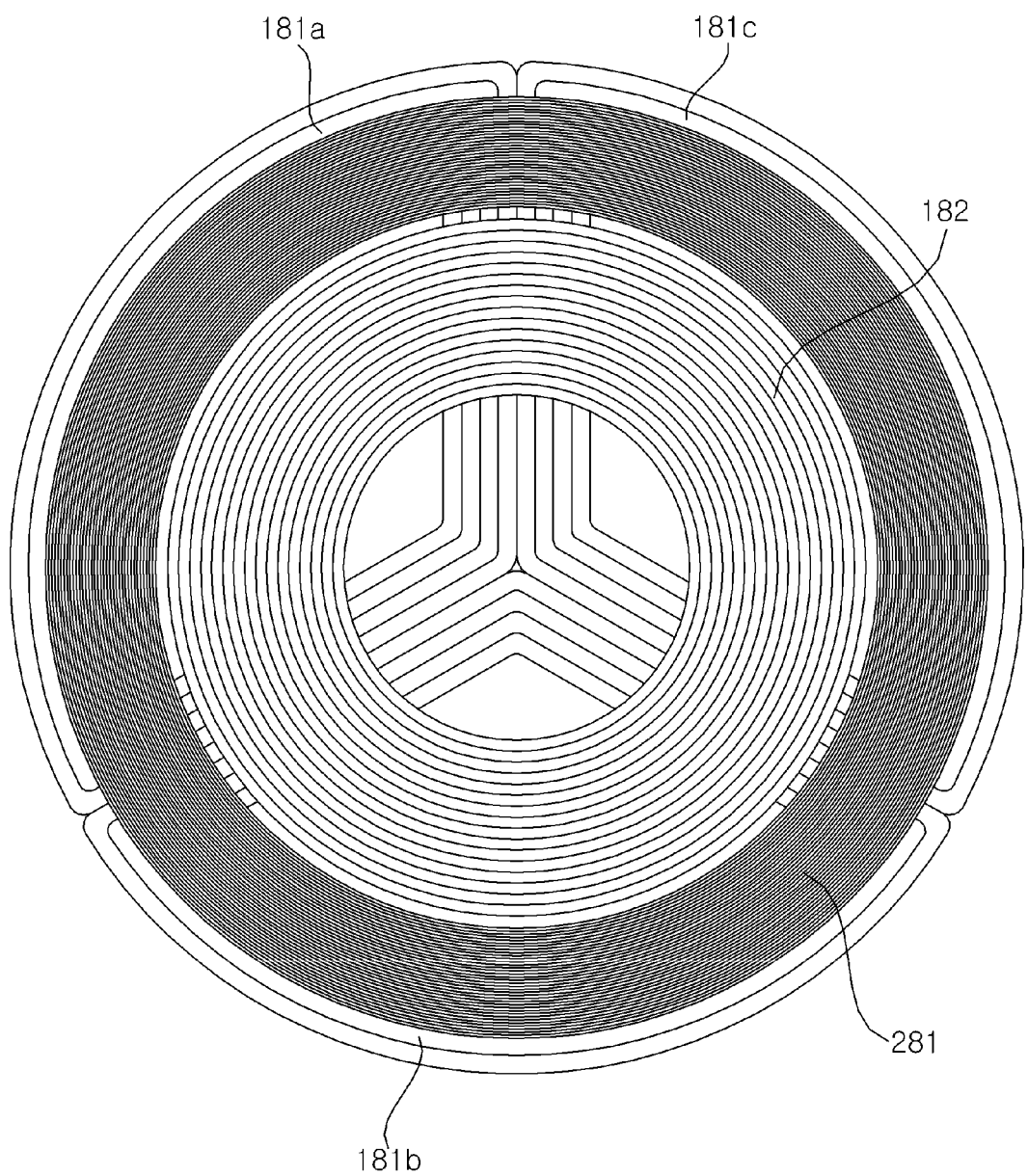
FIGS. 11A and 11B are diagrams referred to in explaining a type of a receiving coil included in a wireless power receiver according to various embodiments of the present disclosure.
Figure 11B:
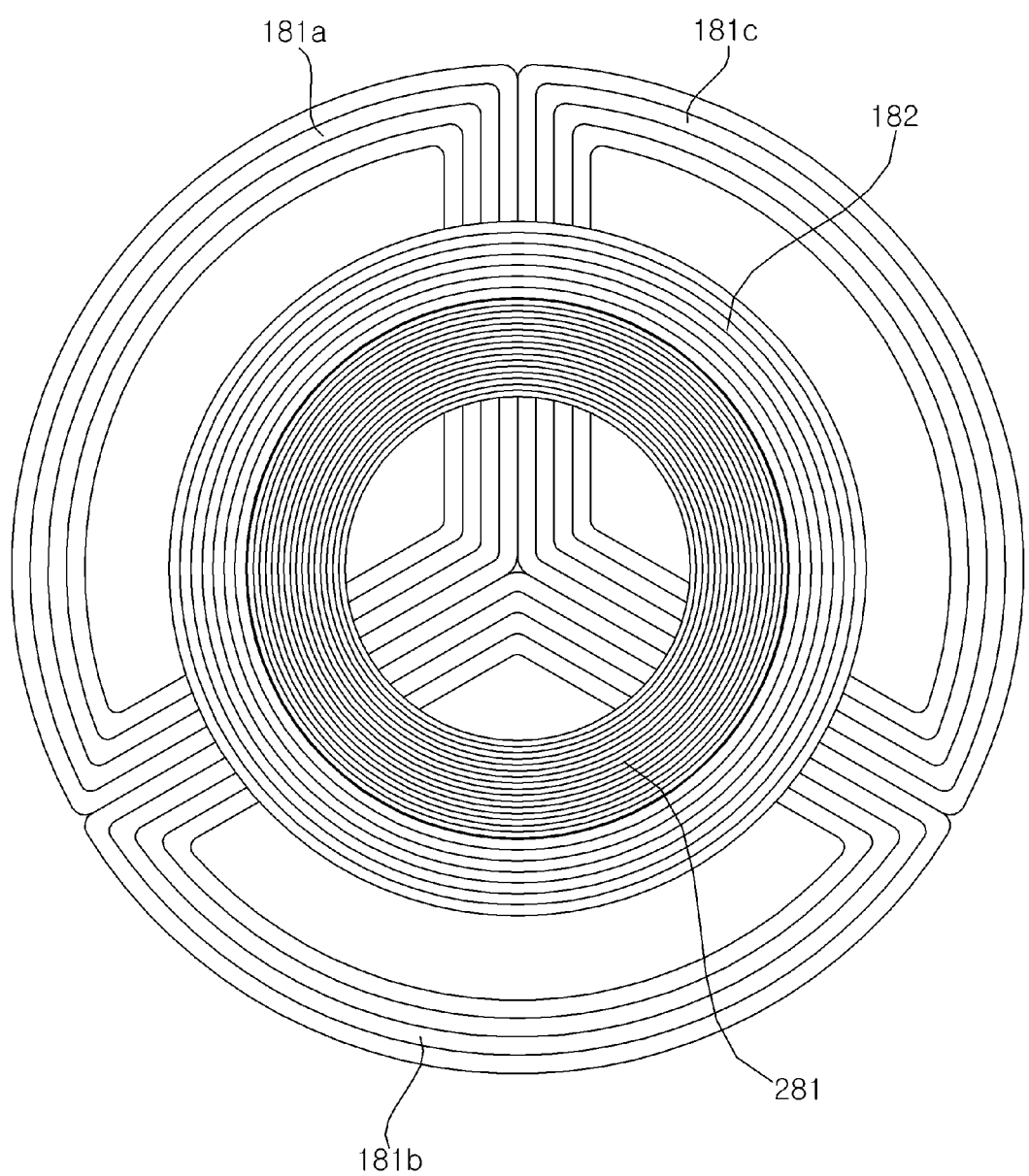

FIG. 10 is a flowchart illustrating an operation method of a wireless power transmitter according to an embodiment of the present disclosure, and FIGS. 11A and 11B are diagrams referred to in explaining a type of a receiving coil included in a wireless power receiver according to various embodiments of the present disclosure.

Referring to FIG. 10, the wireless power transmitter 100 may identify a type of the receiving coil 281 included in the wireless power receiver 200 in S1010. For example, the wireless power transmitter 100 may identify the type of the receiving coil 281 based on the power class data received from the wireless power receiver 200 in the identification and configuration phase S430 of FIG. 4.

The wireless power transmitter 100 may identify whether the type of the receiving coil 281 is a first type, being a medium-power charging type, in S1020. For example, upon confirming that the wireless power receiver 200 uses a medium-power charging type, the wireless power transmitter 100 may identify that the type of the receiving coil 281 is the first type.

If the type of the receiving coil 281 is the first type, the wireless power transmitter 100 may transmit power through both the plurality of first transmitting coils 181 and the second transmitting coil 182 in S1030.

As illustrated in FIG. 11A, if the wireless power receiver 200 includes the receiving coil 281 of the first type, being the medium-power charging type, the wireless power transmitter 100 may transmit power through both the plurality of first transmitting coils 181 and the second transmitting coil 182. In this situation, a diameter of the region corresponding to the plurality of first transmitting coils 181 may correspond to a diameter of the first type receiving coil 281.

Further, if the type of the receiving coil 281 is a second type being a low-power charging type, the wireless power transmitter 100 may transmit power through the second transmitting coil 182 in S1040.

As illustrated in FIG. 11B, if the wireless power receiver 200 includes the receiving coil 281 of the second type, being the low-power charging type, the wireless power transmitter 100 may transmit power only through the second transmitting coil 182. In this situation, a diameter of the region corresponding to the second transmitting coil 182 may correspond to a diameter of the second type receiving coil 281 for low power charging.

According to various embodiments of the present disclosure as described above, power may be transmitted in various manners based on the power class of the wireless power receiver 200, e.g., the type of the receiving coil 281.

Figure 12:
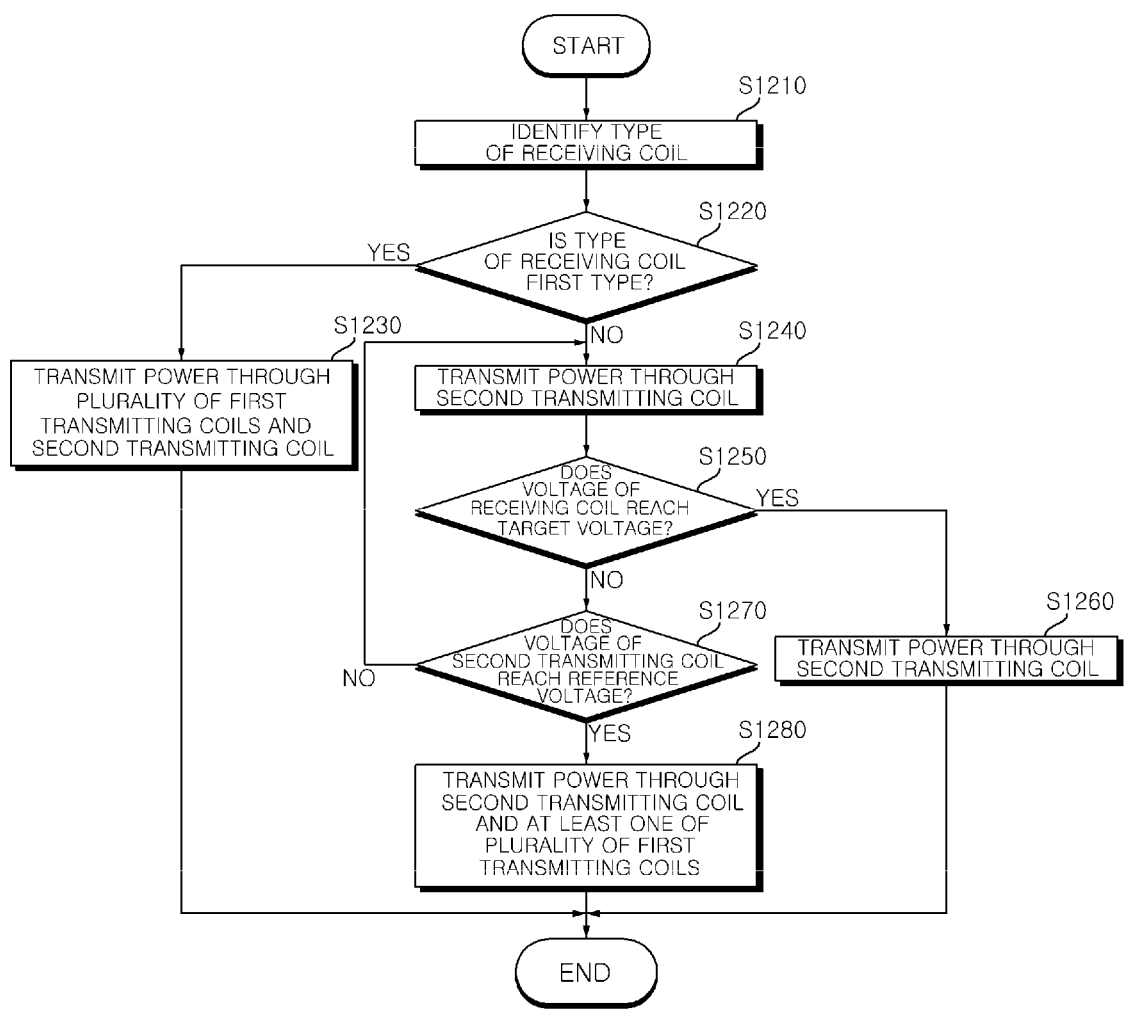
FIG. 12 is a flowchart illustrating an operation method of a wireless power transmitter according to another embodiment of the present disclosure.

FIG. 12 is a flowchart illustrating an operation method of a wireless power transmitter according to another embodiment of the present disclosure. Referring to FIG. 12, the wireless power transmitter 100 may identify a type of the receiving coil 281 included in the wireless power receiver 200 in S1210.

For example, the wireless power transmitter 100 may identify the type of the receiving coil 281 based on the power class data received from the wireless power receiver 200 in the identification and configuration phase S430 of FIG. 4. The wireless power transmitter 100 may identify whether the type of the receiving coil 281 is a first type, being a medium-power charging type, in S1220. For example, upon confirming that the wireless power receiver 200 uses a medium-power charging type, the wireless power transmitter 100 may identify that the type of the receiving coil 281 is the first type.

If the type of the receiving coil 281 is the first type, the wireless power transmitter 100 may transmit power through both the plurality of first transmitting coils 181 and the second transmitting coil 182 in S1230. For example, upon identifying that the type of the receiving coil 281 is the first type, the wireless power transmitter 100 may transmit power through both the plurality of first transmitting coils 181 and the second transmitting coil 182 in the power transfer phase S470 of FIG. 4.

Further, if the type of the receiving coil 281 is a second type being a low-power charging type, the wireless power transmitter 100 may transmit power through the second transmitting coil 182 in S1240. For example, upon identifying that the type of the receiving coil 281 is the second type, the wireless power transmitter 100 may transmit power through the second transmitting coil 182 in the calibration phase S460 of FIG. 4.

The wireless power transmitter 100 may check whether a voltage applied to the receiving coil 281 reaches a predetermined target voltage (e.g., 12 V) in S1250. For example, upon receiving a signal including data on a request for an increase in transmitted power from the wireless power receiver 200, the wireless power transmitter 100 may determine that the voltage applied to the receiving coil 281 does not reach the predetermined target voltage (e.g., 12 V).

If the voltage applied to the receiving coil 281 does not reach the predetermined target voltage (e.g., 12 V), the wireless power transmitter 100 may check whether the voltage applied to the second transmitting coil 182 reaches a preset reference voltage (e.g., 20 V) in S1260. In this situation, if the voltage applied to the second transmitting coil 182 does not reach the preset reference voltage (e.g., 20 V), the procedure returns to S1240, such that the wireless power transmitter 100 may increase the transmitted power by increasing a voltage value of the voltage applied to the second transmitting coil 182.

If the voltage applied to the receiving coil 281 reaches the predetermined target voltage (e.g., 12 V) before the voltage applied to the second transmitting coil 182 reaches the preset reference voltage (e.g., 20 V), the wireless power transmitter 100 may transmit power through the second transmitting coil 182 in S1270. For example, if the voltage applied to the receiving coil 281 reaches the predetermined target voltage (e.g., 12 V) before the voltage applied to the second transmitting coil 182 reaches the preset reference voltage (e.g., 20 V), the wireless power transmitter 100 may transmit power through the second transmitting coil 182 in the power transfer phase S470 of FIG. 4.

In addition, if the voltage applied to the second transmitting coil 182 reaches the preset reference voltage (e.g., 20 V) before the voltage applied to the receiving coil 281 reaches the predetermined target voltage (e.g., 12 V), the wireless power transmitter 100 may transmit power through the second transmitting coil 182 and at least one of the plurality of first transmitting coils 181 in S1280.

In other words, if the wireless power transmitter 100 determines that it is difficult to transmit power, satisfying predetermined criteria, through the second transmitting coil 182, the wireless power transmitter 100 may select at least one of the plurality of first transmitting coils 181, and may control power to be transmitted through the selected first transmitting coil 181 along with the second transmitting coil 182.

In this situation, the wireless power transmitter 100 may select at least one of the plurality of first transmitting coils 181 based on a position of the wireless power receiver 200 in the charging area, which will be described below in detail with reference to FIGS. 13A to 14D.

Figure 13A:
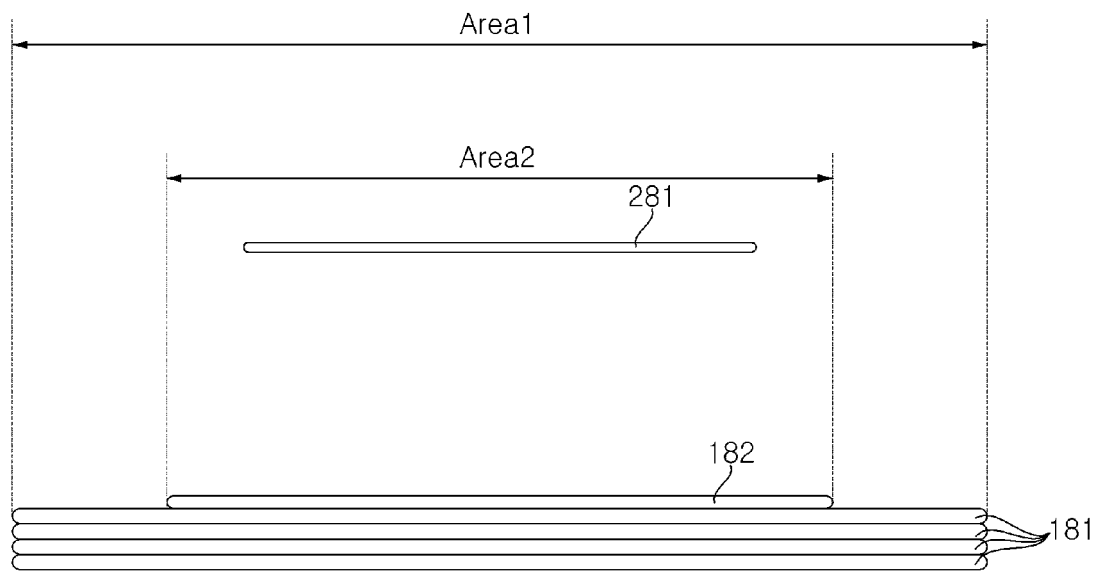
FIGS. 13A and 13B are diagrams referred to in explaining alignment of a wireless power transmitter and a wireless power receiver during low power transmission, according to various embodiments of the present disclosure.
Figure 13B:
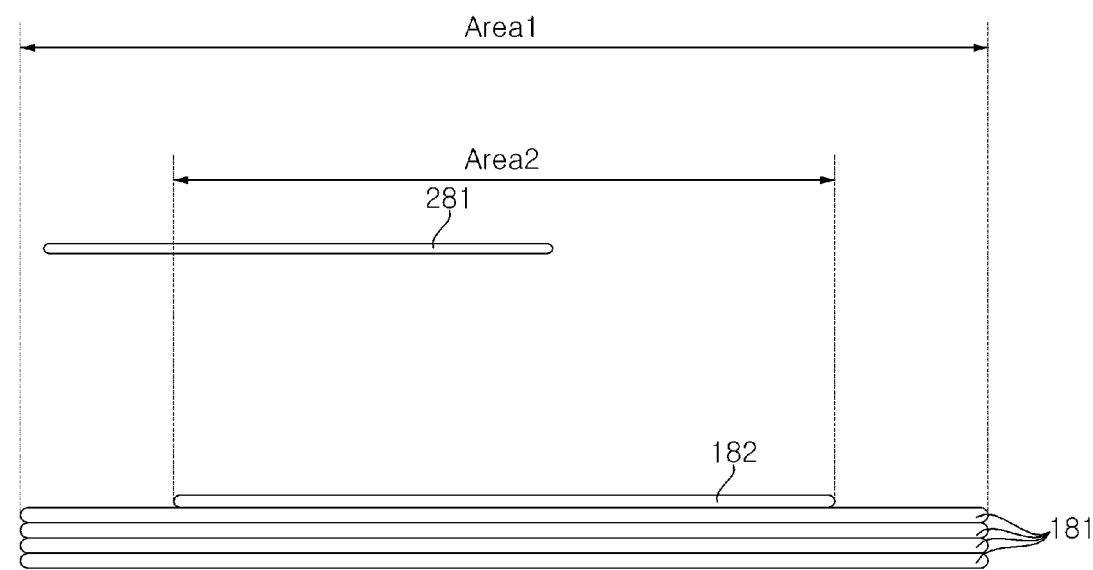

FIGS. 13A and 13B are diagrams referred to in explaining alignment of a wireless power transmitter and a wireless power receiver during low power transmission, according to various embodiments of the present disclosure. As illustrated in FIG. 13A, if the receiving coil 281 is located in an area (Area 2) corresponding to the second transmitting coil 182, it is possible to transmit power, satisfying predetermined criteria, through the second transmitting coil 182.

In other words, if the receiving coil 281 is located in the area (Area 2) corresponding to the second transmitting coil 182, the voltage applied to the receiving coil 281 may reach the predetermined target voltage (e.g., 12 V) before the voltage applied to the second transmitting coil 182 reaches the preset reference voltage (e.g., 20V). Further, as illustrated in FIG. 13B, if the receiving coil 281 is spaced apart by a distance, greater than or equal to a predetermined distance, from the center of the area (Area 2) corresponding to the second transmitting coil 182, it may be difficult to transmit power, satisfying predetermined criteria, through the second transmitting coil 182.

In other words, if the receiving coil 281 is spaced apart by a distance, greater than or equal to a predetermined distance, from the center of the area (Area 2) corresponding to the second transmitting coil 182, the voltage applied to the second transmitting coil 182 may reach the preset reference voltage (e.g., 20 V) before the voltage applied to the receiving coil 281 reaches the predetermined target voltage (e.g., 12 V). In this situation, if it is difficult to transmit power, satisfying predetermined criteria, through the second transmitting coil 182, the wireless power transmitter 100 may select at least one of the plurality of first transmitting coils 181 based on the position of the receiving coil 281 for use in power transmission.

FIGS. 14A to 14D are diagrams referred to in explaining a first transmitting coil, corresponding to a position of a wireless power receiver, during low power transmission according to various embodiments of the present disclosure. The wireless power transmitter 100 may transmit signals to the wireless power receiver 200 through each of the plurality of first transmitting coils 181a to 181c, and may receive response signals, including signal strength data of the signals transmitted through each of the plurality of first transmitting coils 181a to 181c, from the wireless power receiver 200.

Figure 14A:
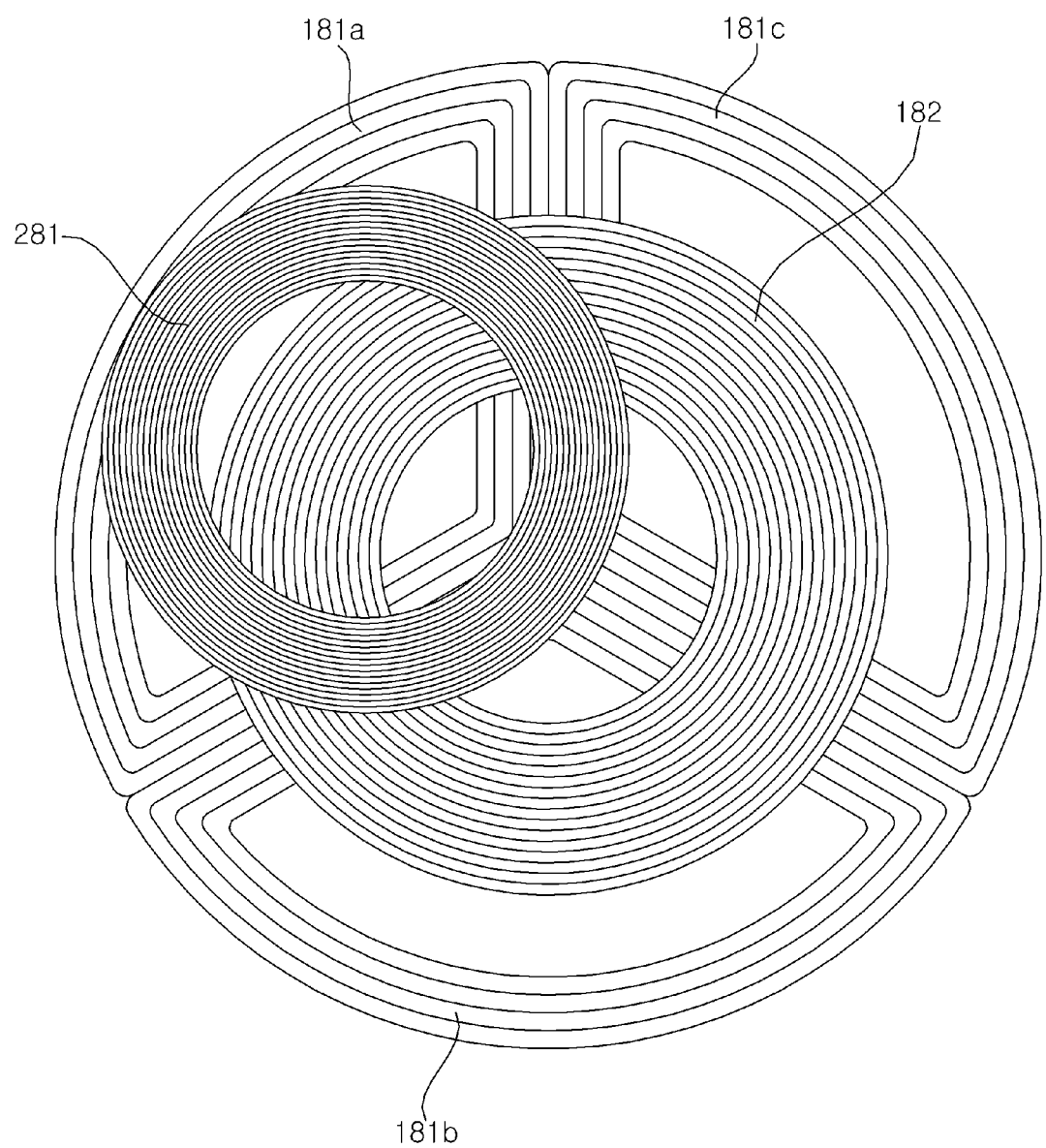
FIGS. 14A to 14D are diagrams referred to in explaining a first transmitting coil, corresponding to a position of a wireless power receiver, during low power transmission according to various embodiments of the present disclosure.

As illustrated in FIG. 14A, if the receiving coil 281 is disposed on an upper end of any one 181a of the plurality of first transmitting coils, the wireless power receiver 200 may detect signal strengths of the signals transmitted through each of the plurality of first transmitting coils 181a to 181c, in which the detected signal strength of the signal transmitted through the any one 181a of the plurality of first transmitting coils may be greater than the detected signal strengths of the signals transmitted through the other first transmitting coils 181b and 181c.

In this situation, based on the signal strengths of the signals transmitted through each of the plurality of first transmitting coils 181a to 181c, the wireless power transmitter 100 may determine that the receiving coil 281 is disposed on an upper end of the first transmitting coil 181a, through the signal having a highest signal strength is transmitted. Furthermore, the wireless power transmitter 100 may transmit power through the second transmitting coil 182, and the first transmitting coil 181a corresponding to the position of the receiving coil 281.

Figure 14B:
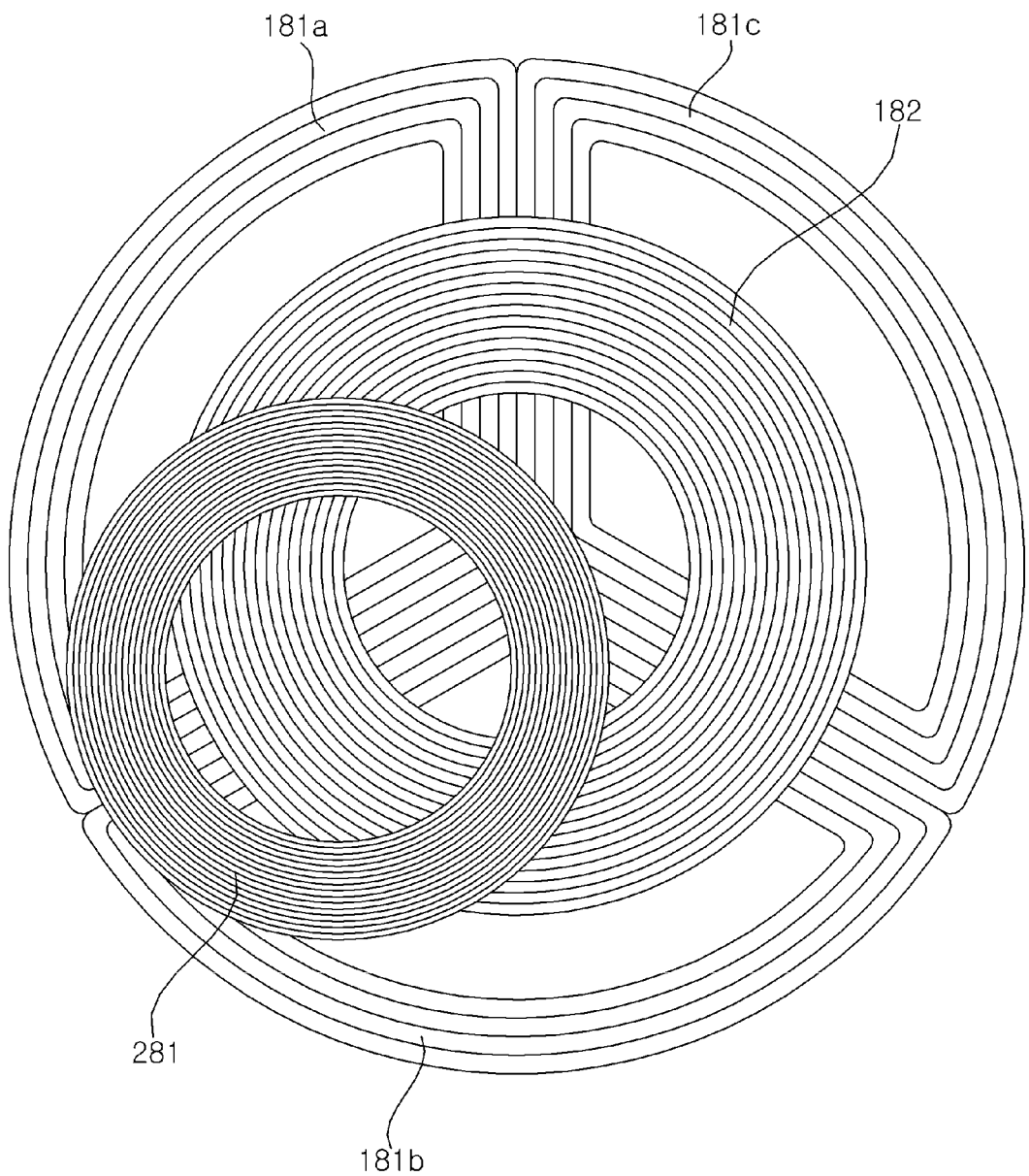
Figure 14C:
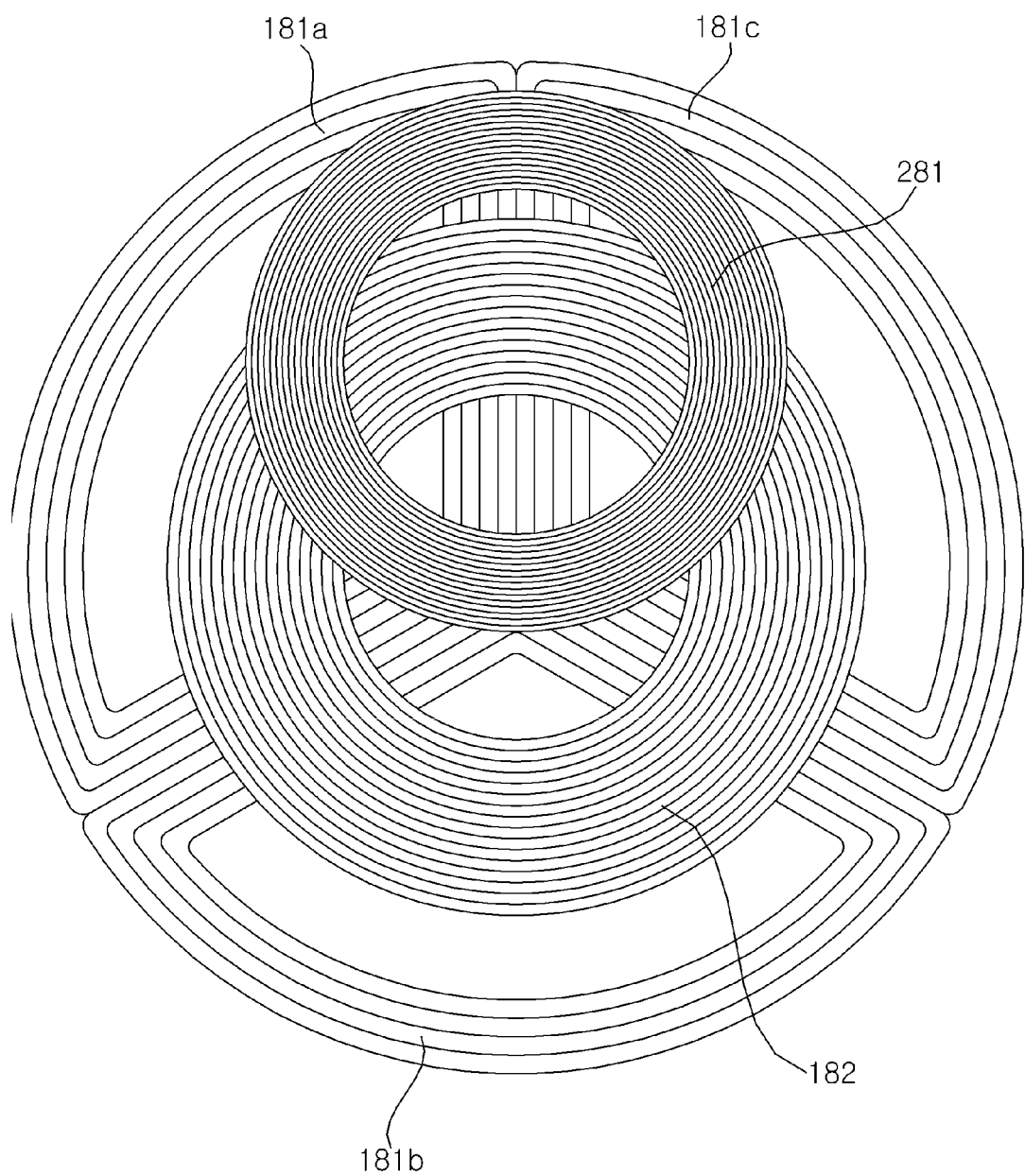
Figure 14D:
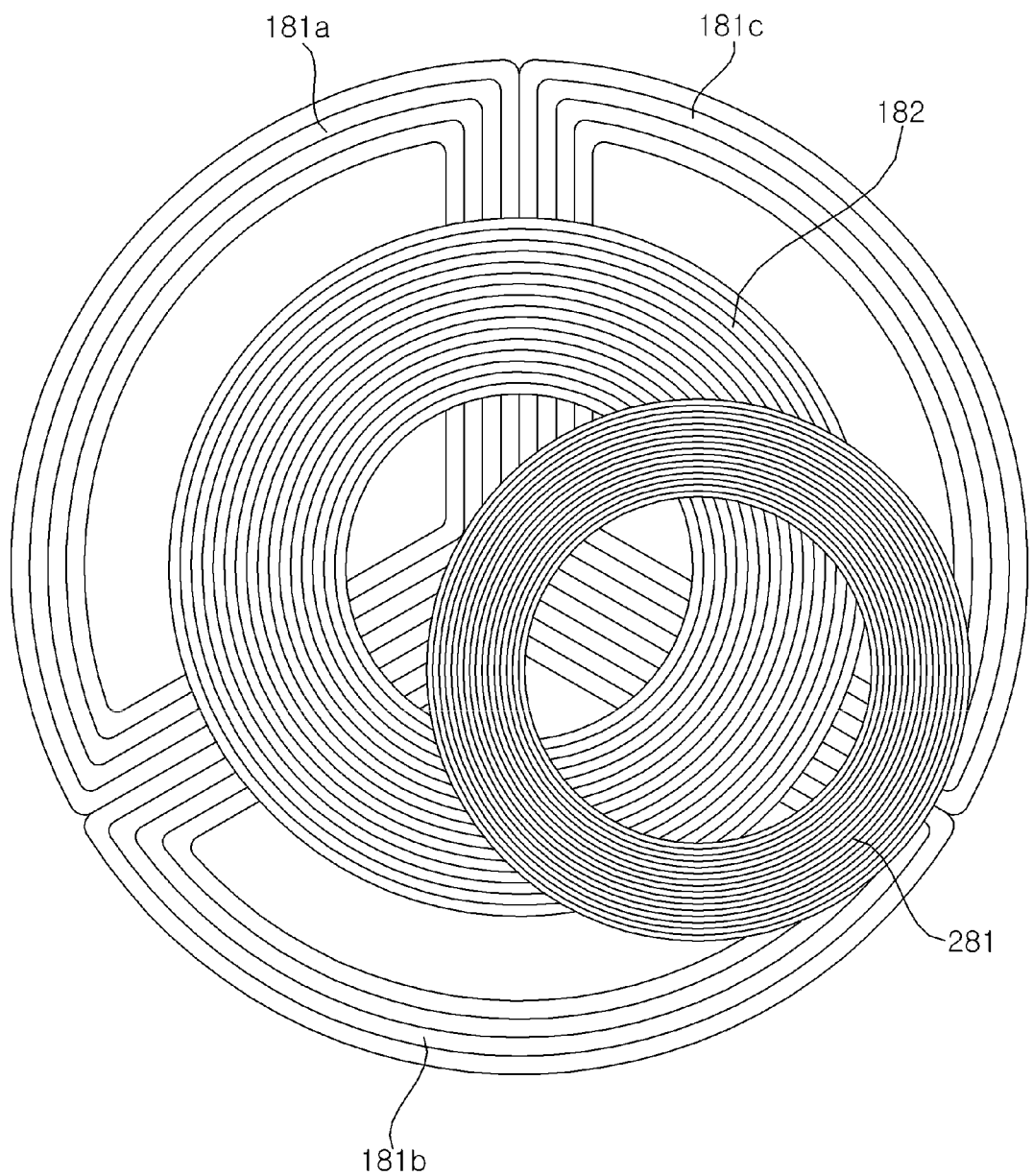

As illustrated in FIGS. 14B to 14D, if the receiving coil 281 is disposed over two first transmitting coils 181a and 181b, 181b and 181c, or 181a and 181c, the signal strength of the two first transmitting coils, corresponding to the position of the receiving coil 281, may be greater than the signal strength of the remaining first transmitting coil.

In this situation, if a difference between the two highest signal strengths is within a predetermined reference value, the wireless power transmitter 100 may determine that the receiving coil 281 is disposed on an upper end of two first transmitting coils 181a and 181b, 181b and 181c, or 181a and 181c corresponding to the two highest signal strengths. In addition, the wireless power transmitter 100 may transmit power through the second transmitting coil 182, and the two first transmitting coils 181a and 181b, 181b and 181c, or 181a and 181c corresponding to the position of the receiving coil 281.

According to various embodiments of the present disclosure as described above, by using data values related to the plurality of first transmitting coils 181, it is possible to accurately determine the position of the wireless power receiver 200 in the charging area; even when it is difficult to transmit power, satisfying predetermined criteria, through the second transmitting coil 182, power may be transmitted through at least one of the first transmitting coils 181 based on the alignment of the second transmitting coil 182 and the receiving coil 281, such that it is possible to transmit power, satisfying the predetermined criteria, to the wireless power receiver 200.

The features of the present disclosure will be more clearly understood from the accompanying drawings and should not be limited by the accompanying drawings, and it is to be appreciated that all changes, equivalents, and substitutes that do not depart from the spirit and technical scope of the present disclosure are encompassed in the present disclosure.

Similarly, although operations are described in a specific order in the drawings, it is not understood that these operations need to performed in the specific order or in a sequential order in order to acquire a suitable result and that all operations illustrated in the drawings need to be performed. In a specific situation, multitasking and parallel processing may be more suitable.

Although the exemplary embodiments of the present disclosure have been disclosed for illustrative purposes, those skilled in the art will appreciate that various modifications, additions and substitutions are possible, without departing from the scope and spirit of the embodiments as disclosed in the accompanying claims.

What is claimed is:

1. A wireless power transmitter, comprising:
  a power transmitter including a plurality of first transmitting coils and a second transmitting coil;
  a communicator configured to communicate with a wireless power receiver including a receiving coil; and
  a controller,
  wherein the plurality of first transmitting coils are disposed on a same plane,
  wherein the second transmitting coil is disposed on a plane different from the plane on which the plurality of first transmitting coils are disposed,
  wherein the second transmitting coil is disposed at a center of a region corresponding to the plurality of first transmitting coils,
  wherein an area of a region corresponding to the second transmitting coil is smaller than an area of the region corresponding to the plurality of first transmitting coils, wherein the controller is configured to:
  transmit power to the wireless power receiver through the plurality of first transmitting coils and the second transmitting coil when a type of the receiving coil is a first type,
  transmit power to the wireless power receiver through the second transmitting coil when the type of the receiving coil included in the wireless power receiver is a second type,
  when the type of the receiving coil is the second type, through the communicator, receive data on a result of power transmitted to the wireless power receiver through the second transmitting coil from the wireless power receiver,
  check a voltage applied to the receiving coil based on the data received from the wireless power receiver, and
  when a voltage applied to the second transmitting coil reaching a preset reference voltage before the voltage applied to the receiving coil reaches a target voltage, transmit power through the second transmitting coil and at least one of the plurality of first transmitting coils,
  wherein the preset reference voltage is a maximum voltage applied to the second transmitting coil when the power is transmitted to the wireless power receiver through the second transmitting coil, and
  wherein the target voltage is a voltage to be applied to the receiving coil by transmitting power through the second transmitting coil.

2. The wireless power transmitter of claim 1, wherein a difference between a radius of the region corresponding to the plurality of first transmitting coils and a radius of the receiving coil of the first type is less than 6% of the radius of the receiving coil of the first type.

3. The wireless power transmitter of claim 1, wherein each of the plurality of first transmitting coils includes wires stacked in multiple layers and wound a plurality of turns in each of the multiple layers.

4. The wireless power transmitter of claim 3, wherein the wires are Litz wires.

5. The wireless power transmitter of claim 3, wherein a total number of turns the wires forming each of the plurality of first transmitting coils are wound in the multiple layers is a 14 to 18 turns.

6. The wireless power transmitter of claim 3, wherein the wires forming each of the plurality of first transmitting coils are wound 4 turns in each of four layers, to have a total of 16 turns among the four layers.

7. The wireless power transmitter of claim 1, wherein the second transmitting coil is formed with a wire wound a plurality of turns in a single layer.

8. The wireless power transmitter of claim 7, wherein the wire forming the second transmitting coil is wound 16 turns in the single layer.

9. The wireless power transmitter of claim 1, further comprising:
  a shielding material disposed on one surface of the plurality of first transmitting coils,
  wherein the shielding material has a plurality of projecting surfaces, the plurality of projecting surfaces being surrounded by inner circumferences of the plurality of first transmitting coils, respectively.

10. The wireless power transmitter of claim 1,
  wherein the controller is further configured to identify the type of the receiving coil included in the wireless power receiver based on data received through the communicator.

11. The wireless power transmitter of claim 1, wherein the controller is further configured to:
  in response to transmitting a signal to the wireless power receiver through at least one of the plurality of first transmitting coils, receive a response signal from the wireless power receiver through the communicator; and
  determine the at least one of the plurality of first transmitting coils for transmitting the power to the receiving coil based on the response signal.

12. The wireless power transmitter of claim 11, wherein the controller is further configured to:
  determine the at least one of the plurality of first transmitting coils to transmit the power to the wireless power receiver based on data on a signal strength of the signal included in the response signal.

13. The wireless power transmitter of claim 1, further comprising:
  a sensing part including a plurality of magnetic sensors configured to detect a magnetic field,
  wherein the controller is further configured to:
    transmit a signal to the wireless power receiver through one or more of the plurality of first transmitting coils;
    determine the at least one of the plurality of first transmitting coils based on sensing values sensed by the plurality of magnetic sensors; and
    transmit power to the receiving coil through the second transmitting coil and the determined at least one of the plurality of first transmitting coils.

14. A wireless power system comprising:
  a wireless power transmitter and a wireless power receiver,
  wherein the wireless power receiver comprises:
    a receiving coil;
    a first communicator configured to communicate with the wireless power transmitter; and
    a controller configured to:
      determine a voltage applied to the receiving coil, and
      transmit, through the first communicator, data on a result of power transmitted from the wireless power receiver,
  wherein the wireless power transmitter comprises:
    a power transmitter including a plurality of first transmitting coils and a second transmitting coil;
    a second communicator configured to communicate with the wireless power receiver; and
    a controller,
  wherein the plurality of first transmitting coils are disposed on a same plane,
  wherein the second transmitting coil is disposed on a plane different from the plane on which the plurality of first transmitting coils are disposed,
  wherein the second transmitting coil is disposed at a center of a region corresponding to the plurality of first transmitting coils,
  wherein an area of a region corresponding to the second transmitting coil is smaller than an area of the region corresponding to the plurality of first transmitting coils, wherein the controller of the transmitter is further configured to:
  transmit power to the wireless power receiver through the plurality of first transmitting coils and the second transmitting coil when a type of the receiving coil is a first type,
  transmit power to the wireless power receiver through the second transmitting coil when the type of the receiving coil included in the wireless power receiver is a second type,
  when the type of the receiving coil is the second type, through the second communicator, receive the data from the wireless power receiver,
  check a voltage applied to the receiving coil based on the data received from the wireless power receiver, and
  when a voltage applied to the second transmitting coil reaching a preset reference voltage before the voltage applied to the receiving coil reaches a target voltage, transmit power through the second transmitting coil and at least one of the plurality of first transmitting coils,
  wherein the preset reference voltage is a maximum voltage applied to the second transmitting coil when the power is transmitted to the wireless power receiver through the second transmitting coil, and
  wherein the target voltage is a voltage to be applied to the receiving coil by transmitting power through the second transmitting coil.

15. The wireless power system of claim 14, wherein a difference between a radius of the region corresponding to the plurality of first transmitting coils and a diameter of the receiving coil of the first type is less than 6% of a radius of the receiving coil of the first type.

16. The wireless power system of claim 14, wherein each of the plurality of first transmitting coils includes wires stacked in multiple layers and wound a plurality of turns in each of the multiple layers.

17. The wireless power system of claim 16, wherein the wires forming each of the plurality of first transmitting coils are wound 4 turns in each of four layers, to have a total of 16 turns among the four layers.

18. The wireless power system of claim 17, wherein the second transmitting coil is formed with a wire wound a plurality of turns in a single layer.

19. A wireless power transmitter, comprising:
  a power transmitter including a plurality of first transmitting coils and a second transmitting coil;
  a shielding material disposed on one surface of the plurality of first transmitting coils; and
  a controller;
  wherein the plurality of first transmitting coils are disposed on a same plane,
  wherein the second transmitting coil is disposed on a plane different from the plane on which the plurality of first transmitting coils are disposed,
  wherein the second transmitting coil is disposed at a center of a region corresponding to the plurality of first transmitting coils,
  wherein an area of a region corresponding to the second transmitting coil is smaller than an area of the region corresponding to the plurality of first transmitting coils,
  wherein the shielding material has a plurality of projecting surfaces, the plurality of projecting surfaces being surrounded by inner circumferences of the plurality of first transmitting coils, respectively, and
  wherein the controller is configured to:
    transmit power to a wireless power receiver through the plurality of first transmitting coils and the second transmitting coil when a type of a receiving coil included in the wireless power receiver is a first type, and
    transmit power to the wireless power receiver through the second transmitting coil when the type of the receiving coil included in the wireless power receiver is a second type.

* * * * *